United States Patent
Gupta et al.

(10) Patent No.: US 10,643,227 B1
(45) Date of Patent: May 5, 2020

(54) BUSINESS LINES

(75) Inventors: Amit Gupta, Gurgaon (IN); Michael Prospero, Foster City, CA (US); Binay Mohanty, New Delhi (IN); Aparna Gupta, Gurgaon (IN); David Cooke, Los Altos, CA (US)

(73) Assignee: AUREA SOFTWARE, INC., Austin, TX (US)

( * ) Notice: Subject to any disclaimer, the term of this patent is extended or adjusted under 35 U.S.C. 154(b) by 569 days.

(21) Appl. No.: 12/831,237

(22) Filed: Jul. 6, 2010

Related U.S. Application Data

(63) Continuation-in-part of application No. 12/772,166, filed on Apr. 30, 2010, now Pat. No. 8,805,840.

(60) Provisional application No. 61/361,510, filed on Jul. 5, 2010, provisional application No. 61/316,824, filed on Mar. 23, 2010.

(51) Int. Cl.
   *G06Q 30/02* (2012.01)
(52) U.S. Cl.
   CPC .............................. *G06Q 30/0204* (2013.01)
(58) Field of Classification Search
   None
   See application file for complete search history.

(56) References Cited

U.S. PATENT DOCUMENTS

| | | | |
|---|---|---|---|
| 5,483,650 A | 1/1996 | Pedersen | |
| 5,640,553 A | 6/1997 | Schultz | |
| 5,717,914 A | 2/1998 | Husick et al. | |
| 5,918,236 A | 6/1999 | Wical | |
| 5,933,822 A | 8/1999 | Braden-Harder et al. | |
| 6,038,561 A | 3/2000 | Snyder et al. | |
| 6,041,331 A | 3/2000 | Weiner et al. | |
| 6,081,774 A | 6/2000 | de Hita et al. | |
| 6,119,124 A | 9/2000 | Broder et al. | |
| 6,125,361 A | 9/2000 | Chakrabarti et al. | |
| 6,154,213 A | 11/2000 | Rennison et al. | |
| 6,285,999 B1 | 9/2001 | Page | |
| 6,349,307 B1 | 2/2002 | Chen | |
| 6,363,377 B1 | 3/2002 | Kravets et al. | |
| 6,377,945 B1 | 4/2002 | Risvik | |
| 6,411,924 B1 | 6/2002 | de Hita et al. | |
| 6,463,430 B1 | 10/2002 | Brady et al. | |
| 6,510,406 B1 | 1/2003 | Marchisio | |

(Continued)

OTHER PUBLICATIONS

U.S. Appl. No. 12/772,166, filed Apr. 30, 2010, Joshi, Ashutosh, et al.

(Continued)

*Primary Examiner* — Dennis W Ruhl

(57) ABSTRACT

Some embodiments provide a method for identifying business lines of a company. The method classifies several documents as relevant to several different business lines and several different companies. For a particular company and particular business line, the method identifies a number of documents classified as relevant to both the particular company and the particular business line. When the identified number of documents exceeds a particular threshold, the method associates the particular business line as a business line of the particular company. In some embodiments, the method calculates a score for each business line in the set. The score for a particular business line represents the importance of the particular business line to the particular company. The method sorts the business lines in the set based on the calculated scores.

19 Claims, 19 Drawing Sheets

(56) References Cited

U.S. PATENT DOCUMENTS

| | | |
|---|---|---|
| 6,601,075 B1 | 7/2003 | Huang et al. |
| 6,658,423 B1 | 12/2003 | Pugh et al. |
| 6,665,662 B1 | 12/2003 | Kirkwood et al. |
| 6,701,318 B2 | 3/2004 | Fox et al. |
| 6,877,137 B1 | 4/2005 | Rivette et al. |
| 6,915,294 B1 | 7/2005 | Singh et al. |
| 7,072,858 B1 | 7/2006 | Litzow et al. |
| 7,103,838 B1 | 9/2006 | Krishnamurthy et al. |
| 7,171,384 B1 | 1/2007 | Fitzpatrick et al. |
| 7,181,438 B1 | 2/2007 | Szabo |
| 7,185,065 B1 | 2/2007 | Holtzman |
| 7,194,691 B1 | 3/2007 | Zilka et al. |
| 7,280,973 B1 | 10/2007 | Hack et al. |
| 7,433,874 B1 | 10/2008 | Wolfe |
| 7,496,567 B1 | 2/2009 | Steichen |
| 7,673,253 B1 | 3/2010 | Agarwal et al. |
| 7,680,773 B1 | 3/2010 | Acharya et al. |
| 7,685,091 B2 | 3/2010 | Boone |
| 7,716,199 B2 | 5/2010 | Guha |
| 7,716,228 B2 | 5/2010 | Sahasrabudhe et al. |
| 7,752,112 B2 | 7/2010 | Gatto et al. |
| 7,818,232 B1 | 10/2010 | Mead et al. |
| 8,051,000 B2 | 1/2011 | Dion Kurvzek et al. |
| 8,136,025 B1 | 3/2012 | Zhu et al. |
| 8,321,398 B2 | 11/2012 | Aumann et al. |
| 8,583,592 B2 | 11/2013 | Stading |
| 8,631,006 B1 | 1/2014 | Haveliwala et al. |
| 9,536,041 B2 | 1/2017 | Xiao et al. |
| 2001/0056396 A1 | 12/2001 | Goino |
| 2002/0123994 A1 | 9/2002 | Schabes et al. |
| 2003/0018659 A1 | 1/2003 | Fuks et al. |
| 2003/0033274 A1 | 2/2003 | Chow et al. |
| 2003/0046307 A1* | 3/2003 | Rivette et al. ............. 707/104.1 |
| 2003/0074516 A1 | 4/2003 | Cho et al. |
| 2003/0130998 A1 | 7/2003 | Fox et al. |
| 2003/0191754 A1 | 10/2003 | Dey et al. |
| 2004/0158569 A1 | 8/2004 | Evans et al. |
| 2005/0060288 A1 | 3/2005 | von Groll |
| 2005/0102267 A1 | 5/2005 | O'Reilly |
| 2005/0108200 A1 | 5/2005 | Meik et al. |
| 2005/0120006 A1 | 6/2005 | Nye |
| 2005/0125429 A1 | 6/2005 | Corston-Oliver et al. |
| 2005/0144162 A1 | 6/2005 | Liang |
| 2005/0160357 A1 | 7/2005 | Rivette et al. |
| 2005/0246221 A1 | 11/2005 | Geritz, III et al. |
| 2006/0004716 A1 | 1/2006 | Hurst-Hiller et al. |
| 2006/0074726 A1 | 4/2006 | Forbes et al. |
| 2006/0106847 A1 | 5/2006 | Eckardt, III et al. |
| 2006/0112079 A1 | 5/2006 | Holt et al. |
| 2006/0129550 A1 | 6/2006 | Zha et al. |
| 2006/0143159 A1 | 6/2006 | Chowdhury et al. |
| 2006/0161543 A1 | 7/2006 | Feng et al. |
| 2006/0167842 A1 | 7/2006 | Watson |
| 2006/0195461 A1 | 8/2006 | Lo et al. |
| 2006/0218111 A1 | 9/2006 | Cohen |
| 2006/0224582 A1 | 10/2006 | Hogue |
| 2006/0230071 A1 | 10/2006 | Kass et al. |
| 2006/0242180 A1 | 10/2006 | Graf et al. |
| 2006/0294101 A1 | 12/2006 | Wnek |
| 2007/0027859 A1 | 2/2007 | Harney et al. |
| 2007/0094251 A1 | 4/2007 | Lu et al. |
| 2007/0118506 A1 | 5/2007 | Kao et al. |
| 2007/0156677 A1 | 7/2007 | Szabo |
| 2007/0198459 A1 | 8/2007 | Boone et al. |
| 2007/0203720 A1 | 8/2007 | Singh et al. |
| 2007/0203816 A1 | 8/2007 | Costache et al. |
| 2007/0288436 A1 | 12/2007 | Cao |
| 2008/0005107 A1 | 1/2008 | Funaki |
| 2008/0033871 A1 | 2/2008 | Birbara et al. |
| 2008/0082578 A1 | 4/2008 | Hogue et al. |
| 2008/0140616 A1 | 6/2008 | Encina et al. |
| 2008/0195567 A1 | 8/2008 | Chen et al. |
| 2008/0243907 A1 | 10/2008 | Stergiou et al. |
| 2008/0244429 A1 | 10/2008 | Stading |
| 2008/0290161 A1 | 11/2008 | Blake |
| 2008/0294624 A1 | 11/2008 | Kanigsberg et al. |
| 2009/0007195 A1 | 1/2009 | Beyabani |
| 2009/0055242 A1 | 2/2009 | Rewari et al. |
| 2009/0055368 A1 | 2/2009 | Rewari et al. |
| 2009/0063437 A1 | 3/2009 | Hendrey |
| 2009/0083251 A1 | 3/2009 | Sahasrabudhe et al. |
| 2009/0228777 A1 | 9/2009 | Henry et al. |
| 2009/0292660 A1 | 11/2009 | Behal et al. |
| 2009/0313236 A1 | 12/2009 | Hernacki et al. |
| 2010/0042623 A1 | 2/2010 | Feng et al. |
| 2010/0138271 A1 | 6/2010 | Henkin et al. |
| 2010/0185651 A1 | 7/2010 | Crow et al. |
| 2011/0010324 A1 | 1/2011 | Bolivar et al. |
| 2011/0010372 A1 | 1/2011 | Sahasrabudhe et al. |
| 2011/0264664 A1 | 10/2011 | Xiao et al. |

OTHER PUBLICATIONS

U.S. Appl. No. 12/831,242, filed Jul. 6, 2010, Gupta, Amit, et al.
Chakrabarti, Soumen, et al., "Focused Crawling: A New Approach to Topic-Specific Web Resource Discovery," Month Unknown, 1999, pp. 545-562, Elsevier Science B.V.
Kleinberg, Jon M., "Authoritative Sources in a Hyperlinked Environment," www.cs.cornell.edu/home/kleinber/, Preliminary version of this paper appeared in the Proceedings of the $9^{th}$ Annual ACM-SIAM Symposium on Discrete Algorithms, Month Unknown, 1998, 34 pages.
Schatz, Bruce, et al., "Federating Diverse Collections of Scientific Literature," May 1996, pp. 28-36, IEEE.
Portions of prosecution history of U.S. Appl. No. 12/831,242, Aug. 30, 2013, Gupta, Amit, et al.
Updated portions of prosecution history of U.S. Appl. No. 12/831,242, Sep. 30, 2014, Gupta, Amit, et al.
Updated portions of prosecution history of U.S. Appl. No. 12/831,242, Jul. 21, 2015, Gupta, Amit, et al.
Final Rejection dated Apr. 22, 2013 in U.S. Appl. No. 12/870,694, p. 1-16.
Amendment and Response to Office Action dated Feb. 8, 2018 in U.S. Appl. No. 12/870,694, p. 1-10.
Amendment and Response to Restriction Requirement dated Aug. 16, 2012 in U.S. Appl. No. 12/870,694, p. 1-5.
Applicant Initiated Interview Summary (PTOL-413) dated Aug. 5, 2013 in U.S. Appl. No. 12/870,694, pp. 1-3.
U.S. Appl. No. 13/754,856, dated Jan. 30, 2013, Joshi et al.
The Free Dictionary, "List", Sep. 2, 2008, The Free Dictionaryby Farlex, http:l/web.archive.org/web/20080907205317/http:l/www.thefreedictionary.com/List (Year: 2008).
Blei et al.; "Latent Dirichlet Allocation"; Jan. 2003, Journal of Machine Learning Research, p. 994 (Year: 2003).
Babowal, D., et al., "From Information to Knowledge: Introducing WebStract's Knowledge Enineering Approach," Proceedings of the 1999 IEEE Canadian Conference on Electrical and Computer Engineering, May 9-12, 1999, pp. 1525-1530, IEEE.
Author Unknown, "Histogram definition—Google Search", Retrieved from the Internet: URL: https://www.google.com/#hl=en&sugexp=les%3B&gs_rn=5&gs_ri=psyab& cp=11&gs_id=7n&xhr=t&q=Histogram+Definition&es_nrs=true&pf=p&sclient=psyab&oq=H is tog ram+ D&gs I=&pbx= 1 &bav=on .2,or. r_gc. r_pw. r_qf .&bvm=bv.43148975, d.aWM&fp=c1860044171 a634f&biw=1540 &bih=903 [Retrieved on Nov. 9, 2012].
Deerwester, Scott, et al, "Indexing by Latent Semantic Analysis" Journal of the American Society for Information Science, Sep. 1990, pp. 391-407, John Wiley & Sons, Inc.
Response to Amendment under Rule 312 dated Jul. 10, 2014 in U.S. Appl. No. 12/772,166, pp. 1-2.
Amendment after Notice of Allowance (Rule 312) dated Jun. 26, 2014 in U.S. Appl. No. 12/772,166, pp. 1-8.
Examiner-Initiated Interview Summary dated Mar. 27, 2014 in U.S. Appl. No. 12/772,166, p. 1.
Amendment and Response to Office Action dated Feb. 24, 2014 in U.S. Appl. No. 12/772,166, pp. 1-12.
Applicant Initiated Interview Summary (PTOL-413) dated Feb. 13, 2014 in U.S. Appl. No. 12/772,166, pp. 1-3.

(56) References Cited

OTHER PUBLICATIONS

Non-Final Rejection dated Oct. 25, 2013 in U.S. Appl. No. 12/772,166, pp. 1-33.
Final Rejection dated Nov. 20, 2012 in U.S. Appl. No. 12/772,166, pp. 1-29.
Amendment and Response to Office Action dated Aug. 23, 2012 in U.S. Appl. No. 12/772,166, pp. 1-10.
Non-Final Rejection dated May 23, 2012 in U.S. Appl. No. 12/772,166, pp. 1-26.
Request for Continued Examination (RCE) dated May 23, 2019 in U.S. Appl. No. 15/662,271, pp. 1-19.
Response to Final Office Action dated Apr. 23, 2019 in U.S. Appl. No. 15/662,271, pp. 1-15.
Final Rejection dated Nov. 23, 2018 in U.S. Appl. No. 15/662,271, pp. 1-21.
Response to Non-Final Office Action dated Aug. 22, 2018 in U.S. Appl. No. 15/662,271, pp. 1-23.
Non-Final Rejection dated Mar. 22, 2018 in U.S. Appl. No. 15/662,271, pp. 1-10.
Preliminary Amendment dated Jul. 28, 2017 in U.S. Appl. No. 15/662,271, pp. 1-3.
Final Rejection dated May 2, 2019 in U.S. Appl. No. 12/870,694, pp. 1-39.
Response to Non-Final Office Action dated Dec. 27, 2018 in U.S. Appl. No. 12/870,694, pp. 1-23.
Non-Final Rejection dated Jul. 27, 2018 in U.S. Appl. No. 12/870,694, pp. 1-38.
Request for Continued Examination (RCE) dated May 3, 2018 in U.S. Appl. No. 12/870,694, pp. 1-16.
Advisory Action (PTOL-303) dated Apr. 12, 2018, in U.S. Appl. No. 12/870,694, pp. 1-5.
Response to Final Office Action submitted Apr. 3, 2018 in U.S. Appl. No. 12/870,694, pp. 1-12.
Final Rejection dated Nov. 3, 2017 in U.S. Appl. No. 12/870,694, pp. 1-15.
Supplemental Amendment dated Sep. 1, 2017 in U.S. Appl. No. 12/870,694, pp. 1-10.
Applicant Initiated Interview Summary (PTOL-413) dated Aug. 2, 2017 in U.S. Appl. No. 12/870,694, pp. 1-2.
Amendment and Response to Office Action dated Jul. 17, 2017 in U.S. Appl. No. 12/870,694, pp. 1-9.
Non-Final Rejection dated Apr. 17, 2017 in U.S. Appl. No. 12/870,694, pp. 1-10.
Patent Board Decision—Examiner Reversed dated Jan. 23, 2017 in U.S. Appl. No. 12/870,694, pp. 1-11.
Appeal Docketing Notice dated Jun. 11, 2014 in U.S. Appl. No. 12/870,694, pp. 1-2.
Reply Brief dated Jun. 2, 2014 in U.S. Appl. No. 12/870,694, pp. 1-18.
Examiner's Answer to Appeal Brief dated Apr. 7, 2014 in U.S. Appl. No. 12/870,694, pp. 1-10.
Appeal Brief submitted Nov. 11, 2013 in U.S. Appl. No. 12/870,694, pp. 1-17.
Pre-Brief Appeal Conference Decision mailed on Sep. 10, 2013 in U.S. Appl. No. 12/870,694, pp. 1-2.
Applicant Summary of Interview with Examiner dated Sep. 4, 2013 in U.S. Appl. No. 12/870,694, pp. 1-2.
Notice of Appeal dated Aug. 20, 2013 in U.S. Appl. No. 12/870,694, pp. 1-2.
Amendment after Notice of Allowance (Rule 312) dated Jul. 18, 2017 in U.S. Appl. No. 12/772,168, pp. 1-8.
Patent Board Decision—Examiner Reversed dated Dec. 27, 2016 in U.S. Appl. No. 12/831,242, pp. 1-6.
Examiner's Answer to Appeal Brief dated Sep. 11, 2015 in U.S. Appl. No. 12/831,242, pp. 1-16.
Appeal Brief submitted Mar. 26, 2015 in U.S. Appl. No. 12/831,242, pp. 1-24.
Pre-Brief Appeal Conference Decision mailed on Jan. 26, 2015 in U.S. Appl. No. 12/831,242, pp. 1-2.
Notice of Appeal dated Dec. 11, 2014 in U.S. Appl. No. 12/831,242, pp. 1-8.
Final Rejection dated Sep. 11, 2014 in U.S. Appl. No. 12/831,242, pp. 1-33.
Amendment and Response to Office Action dated Feb. 24, 2014 in U.S. Appl. No. 12/831,242, pp. 1-12.
Applicant Initiated Interview Summary (PTOL-413) dated Feb. 12, 2014 in U.S. Appl. No. 12/831,242, pp. 1-3.
Non-Final Rejection dated Oct. 25, 2103 in U.S. Appl. No. 12/831,242, pp. 1-32.
Request for Continued Examination (RCE) dated Aug. 12, 2013 in U.S. Appl. No. 12/831,242, pp. 1-12.
Final Rejection dated Feb. 11, 2013 in U.S. Appl. No. 12/831,242, pp. 1-31.
Applicant Initiated Interview Summary (PTOL-413) dated Oct. 16, 2012 in U.S. Appl. No. 12/831,242, pp. 1-4.
Amendment and Response to Office Action dated Oct. 9, 2012 in U.S. Appl. No. 12/831,242, pp. 1-14.
Non-Final Rejection dated Jun. 6, 2012 in U.S. Appl. No. 12/831,242, pp. 1-26.
Petition Decision dated Oct. 11, 2011 in U.S. Appl. No. 12/831,242, p. 1.
Response to Amendment Under Rule 312 dated May 9, 2013 in U.S. Appl. No. 12/870,689, pp. 1-3.
Amendment after Notice of Allowance (Rule 312) dated Apr. 29, 2013 in U.S. Appl. No. 12/870,689, pp. 1-9.
Amendment and Response to Office Action dated Sep. 20, 2012 in U.S. Appl. No. 12/870,689, pp. 1-13.
Non-Final Rejection dated Jun. 20, 2012 in U.S. Appl. No. 12/870,689, pp. 1-16.
Non-Final Rejection dated Feb. 25, 2019 filed in U.S. Appl. No. 12/831,242, pp. 1-10.
Decision on Petition dated Jan. 28, 2019 in U.S. Appl. No. 12/831,242, pp. 1-2.
Request for Continued Examination dated May 8, 2018 in U.S. Appl. No. 12/831,242, pp. 1-29.
Final Rejection dated Nov. 9, 2016 in U.S. Appl. No. 12/831,242, pp. 1-27.
Amendment and Response to Office Action dated Aug. 11, 2016 in U.S. Appl. No. 12/831,242, pp. 1-22.
Non-Final Rejection dated Feb. 11, 2016 in U.S. Appl. No. 12/831,242, pp. 1-36.
Request for Continued Examination dated Jul. 20, 2015 in U.S. Appl. No. 12/831,242, pp. 1-20.
Final Rejection dated Apr. 20, 2015 in U.S. Appl. No. 12/831,242, pp. 1-33.
Amendment and Response to Office Action dated Dec. 30, 2014 in U.S. Appl. No. 12/831,242, pp. 1-15.
Non-Final Rejection dated Sep. 30, 2014 in U.S. Appl. No. 12/831,242, pp. 1-23.
Amendment and Response to Office Action dated Sep. 19, 2014 in U.S. Appl. No. 12/831,242, pp. 1-8.
Notice of Appeal dated Dec. 30, 2013 in U.S. Appl. No. 12/831,242, pp. 1-2.
Final Rejection dated Aug. 30, 2013 in U.S. Appl. No. 12/831,242, pp. 1-32.
Amendment and Response to Office Action dated Aug. 15, 2013 in U.S. Appl. No. 12/831,242, pp. 1-13.
Non-Final Rejection dated Feb. 15, 2013 in U.S. Appl. No. 12/831,242, pp. 1-16.
Response to Amendment Under Rule 312 dated May 9, 2013 in U.S. Appl. No. 12/870,691, pp. 1-3.
Amendment after Notice of Allowance dated Apr. 29, 2013 in U.S. Appl. No. 12/870,691, pp. 1-8.
Applicant Summary of Interview with Examiner dated Nov. 12, 2012 in U.S. Appl. No. 12/870,691, pp. 1-2.
Applicant Initiated Interview Summary dated Oct. 12, 2012 in U.S. Appl. No. 12/870,691, pp. 1-3.
Amendment and Response to Office Action dated Sep. 14, 2012 in U.S. Appl. No. 12/870,691, pp. 1-13.

(56) References Cited

OTHER PUBLICATIONS

Non-Final Rejection dated Jun. 14, 2012 in U.S. Appl. No. 12/870,691, pp. 1-15.
Request for Continued Examination dated Nov. 4, 2019, filed in U.S. Appl. No. 12/870,694, pp. 1-20.

* cited by examiner

BUSINESS LINES

CLAIM OF BENEFIT TO PRIOR APPLICATION

This application claims the benefit of U.S. Provisional Application 61/316,824, entitled "Method and System for Document Differentiation", filed Mar. 23, 2010, and U.S. Provisional Application 61/361,510, entitled "Business Lines", filed Jul. 5, 2010. This application is also a continuation in part of U.S. patent application Ser. No. 12/772,166, entitled "Classification of Documents", filed Apr. 30, 2010, which claims the benefit of U.S. Provisional Application 61/316,824. Applications 61/316,824, 61/361,510 and Ser. No. 12/772,166 are incorporated herein by reference.

BACKGROUND

Most information today is stored electronically and is available on the World Wide Web. This information includes blog posts, articles (e.g., news articles, opinion pieces, etc.), research papers, web pages, and many other types of documents. While having this much information available is useful, it may be very difficult to find information relevant to a particular topic.

Search engines exist today to attempt to find documents on the web that relate to a search string input by the user. However, most search engines base their search on just the words and operators (e.g., "and", "or", etc.) entered by a user. When a user searches for a particular topic, the search engine will only find documents that use the entered word or words, which will lead to many relevant documents being completely overlooked. Such search engines cannot provide a good overview of the documents that surround a particular topic.

In addition, search engines are not focused. Once a user searches for a topic, there is no way to narrow this search to a specific aspect of the topic. For instance, a search engine can retrieve documents based on a search of a company name. This may or may not provide documents related to that company. However, focusing the documents on specific aspects of the company is not available in the search engine, as this sort of data is not stored by the search engine.

BRIEF SUMMARY

Some embodiments provide a novel system for identifying a line of business (i.e., a class of goods or services) for a company or other organization (e.g., corporation, partnership, etc.) based on the relevancy of various documents to the line of business and the organization. In some embodiments, the system retrieves numerous documents and identifies the relevancy of the documents to the business line and the organization. Based on the relevancy of the documents, the system associates the business line with the company.

In the system of some embodiments, an initial set of business lines is identified by analyzing the products and services offered by a subset of companies deemed representative of the overall marketplace. For each business line and company (as well as for other categories), the system generates a document classification model used to determine the relevancy of documents to the particular category. The system evaluates documents using the models to identify the relevance of the documents to the categories (e.g., business lines, companies) represented by the models. When a document is relevant to a particular category, the system tags the documents with the category.

In some embodiments, the documents are retrieved on a periodic or continual basis by a document retriever (e.g., a web crawler). The documents may be text files, computer readable files, HTML documents, PDF documents, word-processed documents, web resources, etc. Each of the documents contains a set of document elements. Document elements may include content elements (e.g., glyphs, letters, words, punctuation, numerical characters, symbols, etc.), structural elements (e.g., markup tags, headers, sections, columns, dividers, lines, etc.), and any other elements that can be parsed in a programmatic manner.

As described above, the models are used for a particular business line or company to identify documents relevant to the particular business line or company. Each model includes data that is used to identify documents related to the business line or company that the model represents. In some embodiments, the models include patterns of document elements associated with scores, as well as parameters used in the analysis of documents by the model. The patterns of document elements and associated scores are used to determine the document's relevance to a category.

Using numerous documents related to various business lines and companies, some embodiments associate business lines with companies for which data is stored in the system. In some embodiments, the system sums the total number of documents that are relevant to both a particular company and particular business line. When this sum exceeds a threshold, the system associates the company with the business line. The threshold number may vary based on a number of factors, such as the industry of the business line. The system may iterate through all distinct potential business lines of a company to identify the entire set of business lines for the company.

In some embodiments, the system may also order a company's lines of business. Each business line associated with a company may have a different degree of importance to that company. Different algorithms are used by the business line analyzer in order to sort the business lines associated with a particular company. For instance, some embodiments sort the business lines for a particular company based on the number of documents related to each line of business and the particular company.

Two or more companies may compete within a line of business. Some embodiments analyze company and business line data to identify competitive relationships between companies. In some embodiments, the system identifies the business lines co-occurring between two companies, the importance of the business lines to the companies, the number of documents related to both the companies and the business lines, etc., to determine whether the two companies are competitors.

The system of some embodiments generates a competitor score for the competitive relationship between the two companies (e.g., based on the number of co-occurring business lines between two companies). If the competitor score is above a threshold level, the system stores the competitive relationship between the two companies. Some embodiments analyze whether a competitive relationship exists between two companies when there is at least one line of business in which the two companies both operate. When a company has more than one competitor, some embodiments may order the competitors based on the number of co-occurring business lines or another algorithm.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. For instance, in some cases, the techniques described below are described as taking place in a specific order. However, in some embodiments, the techniques are performed in an order different from that described.

Some embodiments provide a novel system for identifying a line of business (i.e., a class of goods or services) for a company or other organization (e.g., corporation, partnership, etc.) based on the relevancy of various documents to the line of business and the organization. In some embodiments, the system retrieves numerous documents and identifies the relevancy of the documents to the business line and the organization. Based on the relevancy of the documents, the system associates the business line with the company.

In some embodiments, the business lines are identified for companies within a system that stores information for numerous (i.e., thousands) of categories, including companies (e.g., Microsoft, Intel, General Motors, etc.), business lines (e.g., operating systems, microprocessors, automobiles, etc.), products (e.g., Bing, Xbox, Windows 7, etc.), people (e.g., Bill Gates, Steve Ballmer, etc.), or any other category about which users of the system may want to research. The stored information in some embodiments includes the relation of the business lines to companies (e.g., the association of operating systems as a business line of Microsoft). This information is accessed by and displayed to users of the system.

Business lines, or lines of business, are used interchangeably herein. A line of business is a general term that refers to a set of one or more highly related products which service a particular customer transaction or business need. One example of a line of business is smart phones, examples of which include Apple's iPhone, Research In Motion's Blackberry, or Google's Nexus One.

In the system of some embodiments, an initial set of business lines is identified by analyzing the products and services offered by a subset of companies deemed representative of the overall marketplace. For each business line and company (as well as for other categories), the system generates a document classification model used to determine the relatedness of documents to the particular category. Processes for generating such document classification models are described in detail in the U.S. patent application Ser. No. 12/772,168, entitled "Models for Classifying Documents", which is incorporated herein by reference (hereinafter "the '168 application").

Figure 1:
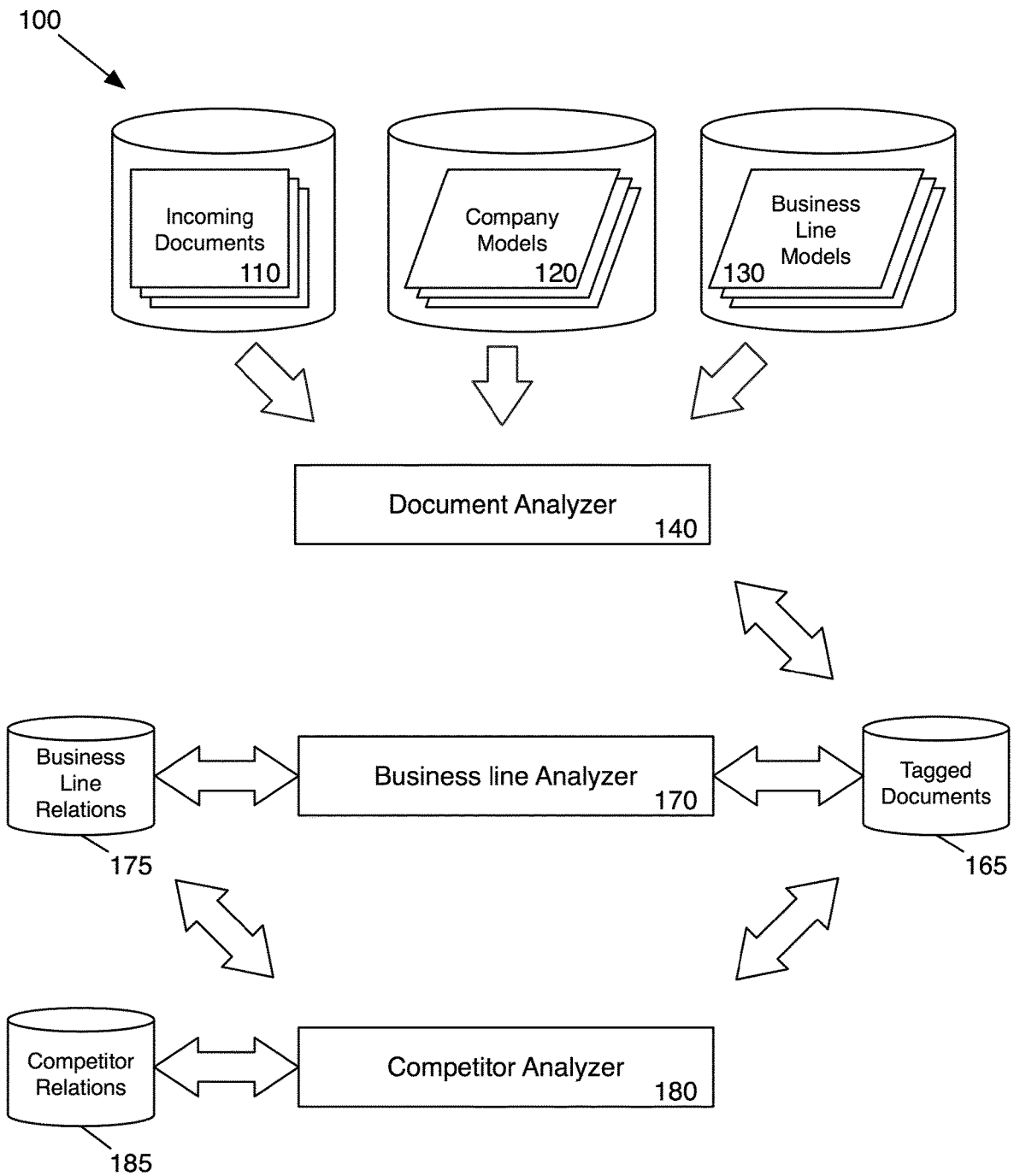
FIG. 1 illustrates an overall system of some embodiments.

FIG. 1 conceptually illustrates such a system 100 of some embodiments for associating lines of business with companies. The system 100 of some embodiments includes a document analyzer 140, a business line analyzer 170, and a competitor analyzer 180. The system 100 also includes tagged document storage 165, business line relations storage 175 and competitor relations storage 185. In some embodiments, the business line relations and competitor relations are stored in the same data structures, but they are illustrated here separately for explanatory purposes.

The document analyzer 140 receives as inputs documents 110, company models 120 and business line models 130. Document analyzer 140 evaluates documents 110 using the models 120 and/or 130 to identify the relevance of the documents to the categories (e.g., business lines, companies) represented by the models. When a document is relevant to a particular category, the document analyzer 140 tags the documents with the category.

In some embodiments, the documents 110 are retrieved on a periodic or continual basis by a document retriever, e.g., a web crawler, and stored and/or transmitted to document analyzer 140. Documents 110 may be text files, computer readable files, HTML documents, PDF documents, word-processed documents, web resources, etc. Each of the documents contains a set of document elements. Document elements may include content elements (e.g., glyphs, letters, words, punctuation, numerical characters, symbols, etc.), structural elements (e.g., markup tags, headers, sections, columns, dividers, lines, etc.), and any other elements that can be parsed in a programmatic manner.

As described above, the company models 120 and business line models 130 are used for a particular business line or company to identify documents relevant to the particular business line or company. Each model includes data that is used to identify documents related to the business line or company that the model represents. In some embodiments, the models include patterns of document elements associated with scores, as well as parameters used in the analysis of documents by the model.

The patterns of document elements stored in the models may be any pattern (e.g., an uninterrupted sequence of words, groups of words within a certain proximity of each other, pairs of words within a certain proximity of each other, etc.). For example, the patterns of document elements of some models is a pair of word sets, with an anchor word set and other word sets within the context of the anchor word forming a pair of word sets. Different word set pairs of the model may have different associated scores that are used in calculating a score for a document that contains the word set pairs.

In some embodiments, the document analyzer 140 applies the models 120 and/or 130 to each of the documents 110 by identifying the patterns of document elements in the document. The document analyzer 140 calculates a relevance score for each document's relation to each of the categories represented by the models. The relevance score for each document is calculated based on the patterns identified in the document and their associated scores. When word pairs are utilized as the patterns of document elements, some embodiments calculate the relevance score for each document as the arithmetic mean of the scores for the word pairs identified in the document. Other embodiments calculate the relevance score as a sum, median, or other function of the scores for the identified word pairs.

The relevance of a particular document to a category varies based on the calculated score. When the document's relevance score for a particular category is above a threshold, the document is tagged, or otherwise related, to the particular category. The document evaluator 140 stores the document and the tags indicating its relevancy to various categories in the storage 165.

Using the numerous documents 110 related to various business lines and companies, the business line analyzer 170 associates business lines with companies for which data is stored in the system 100. Business line analyzer 170 retrieves tagged documents (or data regarding the relevancy of the documents to the various categories) from tagged documents storage 165. In some embodiments, business line analyzer 170 sums the total number of documents that are relevant to both a particular company and particular business line. When this count exceeds a threshold, the business line analyzer 170 associates the company with the business line. The threshold number may vary based on a number of factors, such as the industry of the business line. Business line analyzer 170 may iterate through all distinct potential business lines of a company to identify the entire set of business lines for the company.

In some embodiments, business line analyzer 170 of the system 100 may also order a company's lines of business. Each business line associated with a company may have a different degree of importance to that company. Different algorithms are used by the business line analyzer 170 in order to sort the business lines associated with a particular company. For instance, some embodiments sort the business lines for a particular company based on the number of documents related to each line of business and the particular company. The data generated by the business line analyzer 170 is stored in the business line relations storage 175 in some embodiments.

Two or more companies may compete within a line of business or multiple lines of business. The competitor analyzer 180 of system 100 analyzes company and business line data from the business line storage 175 and the tagged documents 165 to identify competitive relationships between companies. In some embodiments, the competitor analyzer identifies the business lines co-occurring between two companies, the importance of the business lines to the companies, the number of documents related to both the companies and the business lines, etc., to determine whether the two companies are competitors.

In some embodiments, the competitive analyzer 180 analyzes the retrieved data and generates a competitor score for the competitive relationship between the two companies (e.g., based on the number of co-occurring business lines between two companies). If the competitor score is above a threshold level, the competitor analyzer 180 stores the competitive relationship between the two companies in the competitor relations storage 185. The competitor analyzer 180 of some embodiments analyzes whether a competitive relationship exists between two companies when there is at least one line of business in which the two companies both operate. When a company has more than one competitor, some embodiments may order the competitors based on the number of co-occurring business lines or another algorithm.

A competitive relationship typically occurs when two or more companies act independently and attempt to secure the business of a third party. There may be different levels of competition. One level is direct competition, in which two companies each have at least one product of which performs the same function as the other (i.e., the two companies are both in the same business line). Other forms of competition exist, such as substitute or indirect competition where products that are close substitutes for one another compete (e.g. beer competing with wine and distilled beverages).

Several more detailed embodiments are described in the sections below. Section I describes the initial identification of business lines. Section II provides example business line and company models, while Section III discusses document analysis and tagging based on the business line and company models. Section IV discusses business line analysis and Section V discusses competitor analysis. Section VI describes a graphical user interface that displays business line and competitor information about a company. Section VII describes the software architecture of a system that generates the business line and competitor data and provides the data to third party users. Finally, Section VIII describes a computing device which implements some embodiments of the invention.

I. Initial Identification of Business Lines

Some embodiments initially identify a set of business lines that may be associated with numerous different companies. As noted above, a business line serves as a categorization of a set of the same or similar products and services. A company's specific products and services are represented by their business line categorizations. Companies operate and compete in the context of business lines. Business lines are identified so the products and services of numerous companies can be identified and consistently classified, and companies competing within a business line can be identified and compared.

Figure 2:
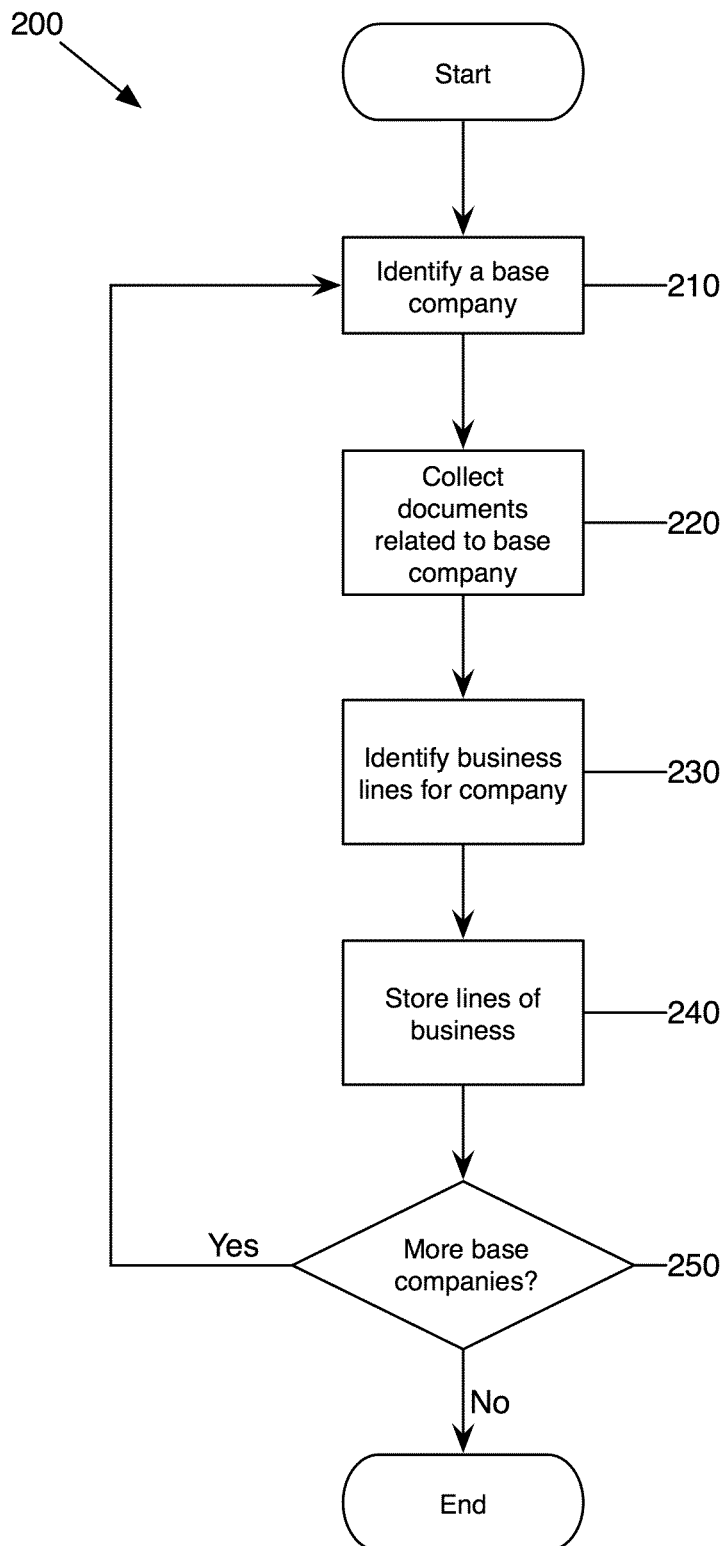
FIG. 2 conceptually illustrates a process of some embodiments for identifying a set of business lines.

FIG. 2 conceptually illustrates a process 200 of some embodiments for identifying a set of business lines. In some embodiments, the process 200 is performed within a system that relates documents to many categories including both the business lines and companies. The process 200 is performed by some embodiments to identify an initial set of business lines from a subset of the companies. Documents can then be related to the identified business lines as well as the companies, and thus information can be used by some embodiments to relate the business lines to additional companies for which the system stores information.

As shown in FIG. 2, the process identifies (at 210) a base company for establishing business lines. Some embodiments identify the base company based on user input (e.g., a user could type a company name or select a company from a list). A system might have a list of all companies for which document classification models are used, and the user can select a company from that list. Large, publicly traded companies are often used as base companies because these companies will typically have the most business lines.

The process 200 then collects (at 220) documents related to the identified base company. These documents may be filings with the Securities and Exchange Commission, documents from the company's website, or any other documents related to that company and its lines of business. In some embodiments, the process 200 collects the documents through a web crawler. In other embodiments, a user manually collects these documents (e.g., by using a web browser to visit the company's website and manually downloading and reviewing documents).

The process 200 identifies (at 230) the business lines of the identified base company based on the collected documents. In some embodiments, a user may identify the business lines based on a review of the collected documents. In the case where the process automatically identifies the business lines, a user may review the identified business lines to reduce potential duplication of business lines. For example, for the business line of notebook computers, various documents may use various names (e.g., laptops, notebooks, netbooks, etc.). A completely automated process might erroneously establish three different business lines related to notebook computers when in fact a user might only desire one business line.

The process 200 then stores (at 240) the identified business lines related to the currently selected base company. In some embodiments, uniquely identified business lines are added to a set of lines of business. The business lines in the stored set may be used as classification categories for documents, and may also be related to additional companies that offer products or services in the business lines.

The process 200 determines (at 250) whether more base companies for which lines of business should be established exist. If additional base companies require establishment of business lines, the process 200 proceeds to 210 to select a remaining base company. Each iteration through the process 200 confirms and/or increases the set of business lines. In some cases a base company will only have business lines that are already stored in the set.

The process 200 ends after a sufficient set of base business lines is established and/or all base companies have had their business lines identified. The determination of whether a set of business lines is sufficient, in some embodiments, is based on user input (e.g., by a user interacting with a GUI).

Once the set of business lines is established, the business lines may be automatedly related to other companies by the system of some embodiments. In order to associate the business lines with companies, some embodiments first use a document classification model for each business line and each company to identify documents that are relevant for each of the categories.

II. Business Line and Company Models

To identify documents as related to categories, such as business lines or companies, the system of some embodiments utilizes criteria that indicates relevance to that category (e.g., patterns of document elements that typically occur in a document that is related to a business line). In some embodiments, the criteria indicating relevance are embodied in a document classification model for the category, such as a business line or company model. To identify documents that are related to the identified set of business lines the system receives or generates a model for each business line. In some embodiments, the system receives or generates a model for other category information, e.g., a company model.

Some embodiments generate a model for each business line and/or company. The business lines for which models are generated or received may include all of the business lines identified for a set of base companies (e.g., via process 200) as well as additional business lines (e.g., a business line not yet associated with any of the chosen base companies). A model for a particular category contains data, such as patterns of document elements, which identifies a document's relevance to the particular category. Methods for generating models of some embodiments are described in detail in the above-referenced '168 application.

Figure 3:
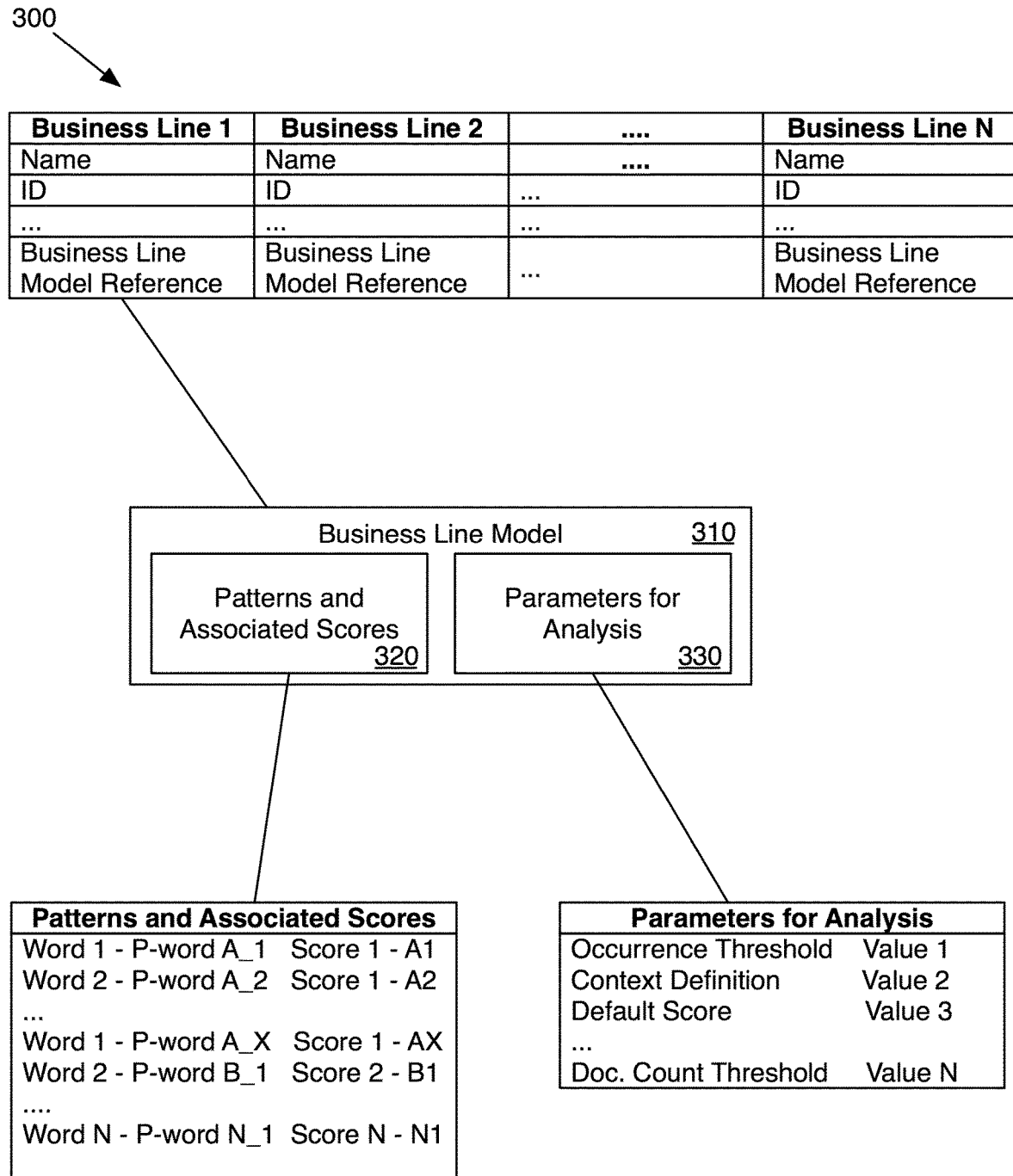
FIG. 3 conceptually illustrates a business line data structure in which each business line of data structure has a referenced business line model.

FIG. 3 conceptually illustrates a business line data structure 300 in which each business line of data structure 300 has a referenced business line model 310. The business line data structure 300 includes multiple business lines. Each business line may have a unique identification, a name, alternative names, a referenced related model 310, or any other data.

The illustrated business line model 310 contains data for identifying documents that are related to the business line. In some embodiments, this data includes patterns of document elements with an associated score 320 and parameters for analysis 330. Some embodiments store the models as text files or markup files (e.g., XML files).

As discussed above, patterns of document elements may include a sequence of words appearing together, several words appearing within a particular proximity of each other, word pairs appearing within the context of each other, or any other pattern of document elements that could indicate a document's relevance to a category. FIG. 3 illustrates a business line model 310 that utilizes word pairs for the pattern of document elements, together with a score, to form patterns and associated scores 320.

Each word pair from the list of word pairs 320 has a score that quantifies the likelihood that a document containing the word pair will be relevant to the business line. A higher score for a word pair indicates that a document containing the word pair is more likely to be relevant to the business line for which the model 310 classifies documents. In some embodiments, the scores can be positive or negative, and a negative score indicates that a document containing the word pair is more likely to not be relevant to the business line.

The parameters for analysis 330 include various parameters used to define how the model will evaluate new documents. In some embodiments, the parameters for analysis 330 may include an occurrence threshold, a context definition, a default score, and/or a document count threshold.

In some embodiments, the context definition determines when a first word is in the context of a second word. In some embodiments, the word pairs consist of an anchor word and a context word. Anchor words are words that are more likely to appear in a document that relates to the particular business line as compared to a document that does not relate to that business line. In some embodiments, context words are words that appear within the context of the anchor words. The determination of when a word is in the context of an anchor word depends on a context definition.

Different embodiments may use different definitions for the context of a word and its relation to an anchor word. Some embodiments define context by proximity, such that all words within a particular number of words of a first word are within the context of that first word. Some embodiments define all words within the sentence or paragraph of a first word as within the context of that first word. In addition, some embodiments allow different definitions of context for different words or different types of documents.

The occurrence threshold in some embodiments is the number of anchor words that must appear in a document for that document to be scored for potential relevancy. Some embodiments do not analyze a document that has a number of anchor words below the occurrence threshold, or assign the document a very low score (e.g., −999) such that it will not be tagged as relevant to the category.

The default score is a score that is assigned to a new word pair that is not found in the model. A new word pair is an anchor word and a context word found in a document that does not occur in the list of word pairs 330 of a model. Some embodiments set the default score to the twenty-fifth percentile score for all of the word pair in the model, or some other statistical property of the score in the model. Other embodiments use a default score of zero or another value.

The document count threshold is a number of documents required for a company to be associated with the business line, as will be discussed below. This parameters is not used in the determination of the relevancy of a document to the business line, and is instead used in the determination of whether a company operates in the business line. Therefore, some embodiments stored the document count threshold elsewhere (e.g., as an entry for the business line in the data structure 300).

Figure 4:
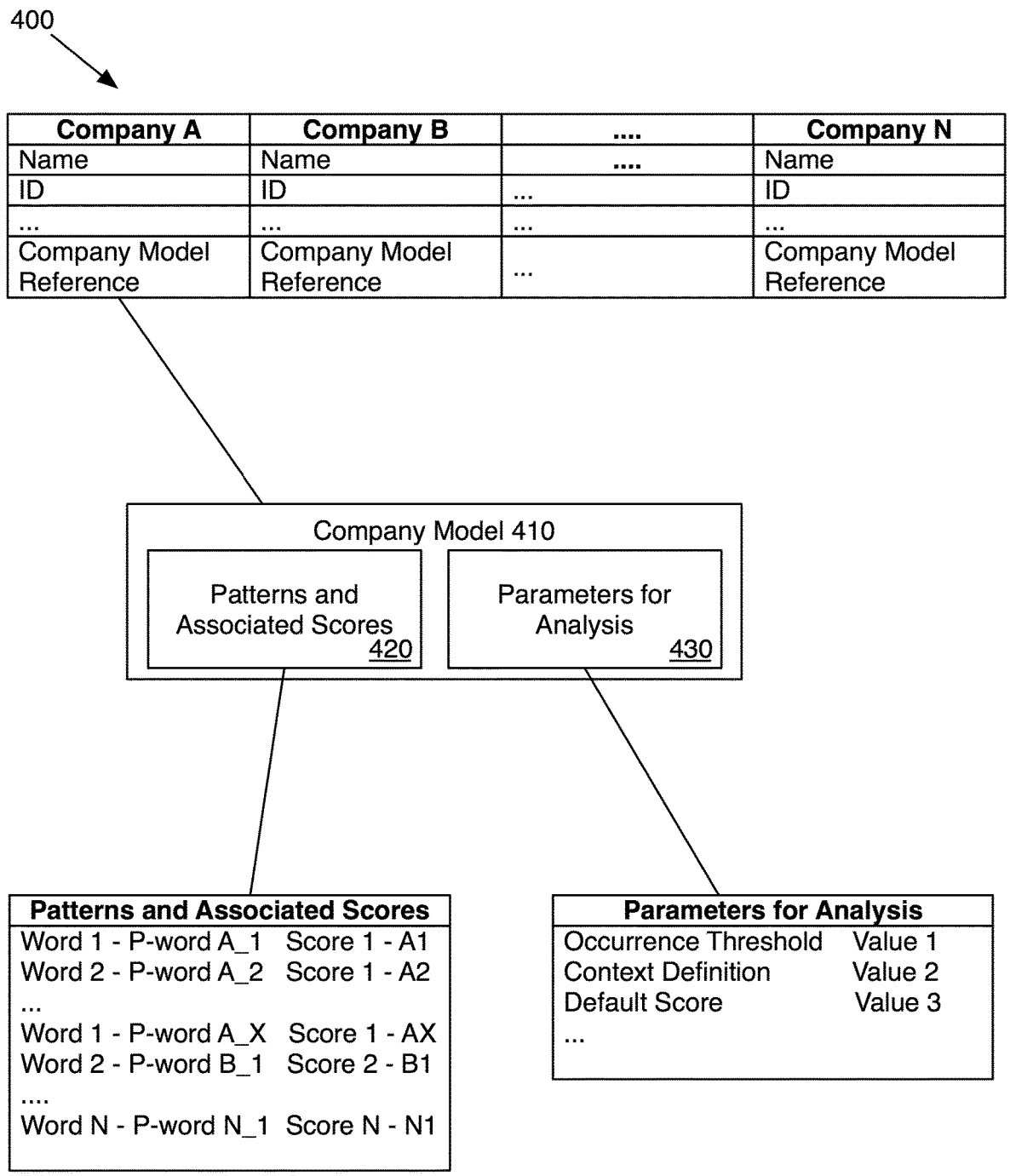
FIG. 4 conceptually illustrates a company data structure.

FIG. 4 conceptually illustrates a company data structure 400. The company data structure 400 contains multiple companies represented by company models. Each company may have a unique identification, a name, alternative names, a referenced related model 410, or any other data. As with the business line model, the referenced company model 410 contains data for identifying documents that are related to the company. In some embodiments, as shown in FIGS. 3 and 4, the structure of the company models is the same as the structure of the business line models (and models for other categories). As shown, the company model 410 includes patters and associated scores 420 (in this example, the patterns are word pairs formed from an anchor word and a context word) and parameters for analysis 430. The parameters 430 include, as with the business line model, an occurrence threshold, context definition, and default score. However, the company model of some embodiments does not include a document count threshold, as some embodiments determine the number of co-relevant documents required to associate a business line with a company based on the business line rather than the company.

FIGS. 3 and 4 illustrate examples of models for business lines and companies. In some embodiments, there are other models for other categories (e.g., people, products, etc.). In some embodiments, the data structure for a type of entity (e.g., business lines data structure 300) is stored in a database, while the referenced models are stored as text files or XML files. The models conceptually represent data that identifies a relationship between a document and a category and need not take any particular form. For example, a model could consist of a process utilizing machine learning and related data, such as a process utilizing a Bayesian classifier and related data.

III. Document Analysis and Tagging

The models described above are used to determine whether documents are related to various categories, including different business lines and companies. Some embodiments use context-based models such as those illustrated in FIGS. 3 and 4. Some embodiments use keyword location-based modules, and some embodiments use both types of models and/or other types of models. The use of multiple types of models is described in further detail in the above-referenced '168 application.

In some embodiments, the document analysis is performed for thousands of new documents daily on an ongoing basis as new documents appear on the World Wide Web. The new documents are evaluated for relevancy to thousands of different categories, each having a different model. The relevancy information may used to identify information such as the relation of business lines to companies, as will be described below in Section IV.

Figure 5:
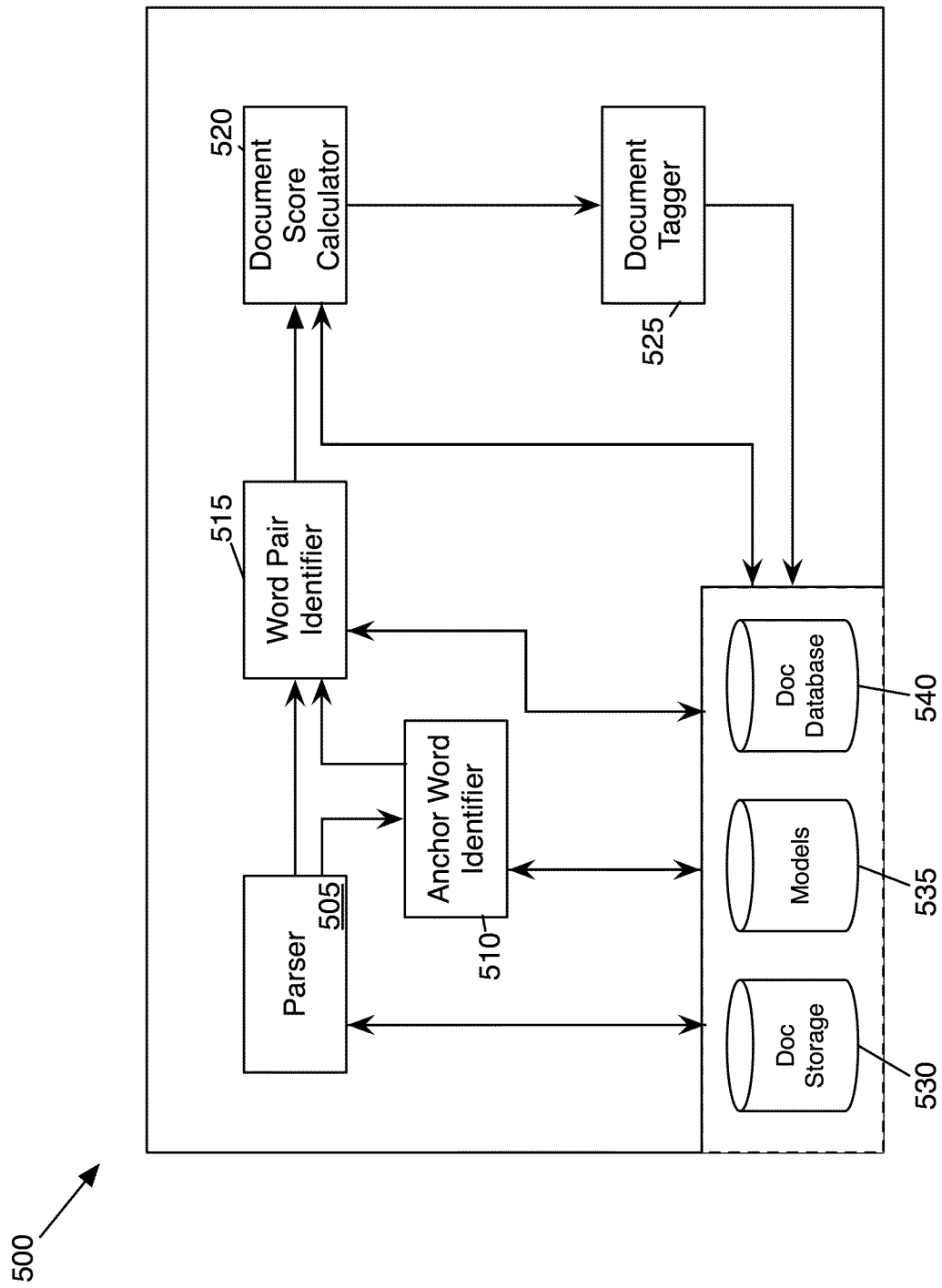
FIG. 5 conceptually illustrates the software architecture of a system that implements a document analysis process of some embodiments.

FIG. 5 conceptually illustrates the software architecture of a system 500 that implements a document analysis process of some embodiments of the invention. The system 500 shown in this figure is one example of a system that evaluates the relevancy of numerous documents to numerous categories using the models for the categories. Some embodiments output a score for each category for each document. These scores specify the relevancy of the documents to the different categories. The system 500 of some embodiments tags, or relates, the document to a business line model if its score is above a threshold value.

As shown in FIG. 5, the system 500 includes a parser 505, an anchor word identifier 510, a word pair identifier 515, a document score calculator 520, a document tagger 525, a document storage 530, a model storage 535 and a document database 540.

The document storage 530 stores a set of documents that are retrieved by a document retriever, such as a web crawler. The retrieved documents, as discussed above, may be text files, computer readable files, HTML documents, PDF documents, word-processing documents, web resources, etc. Each document contains an ordered set of document elements, which can include content elements (e.g., glyphs, letters, words, punctuation, numerical characters, symbols, etc.), structural elements (e.g., markup tags, headers, sections, columns, dividers, lines, etc.), and any other elements that can be parsed in a programmatic manner.

The model storage 535 stores the models, while the document database 540 stores information about the relevancy of the document to different business lines. In some embodiments, storages 530-540 are one physical storage. In other embodiments, all three may be in different physical storages, or may be split between storages. For instance, some embodiments store the documents 530 in one storage and the models 535 and document database 540 together in a different storage. Furthermore, some embodiments may split one of the illustrated storages across numerous physical storages (e.g., there may be so many documents that numerous storages are required to store copies of all of them).

In real time or as a batch process, the parser 505 retrieves each document from the document storage 530 and parses the document to identify all of the words in the document. In some embodiments, this information is then stored (e.g., in volatile memory such as RAM) for use by the other modules while the document is being evaluated. Some embodiments store a parsed copy of the document in the document storage 530 that is accessible by the other modules. In some embodiments, the documents (e.g., html files, PDF documents, etc.) are not actually downloaded from the world wide web, and instead links to the documents are stored in the storage 530. The document is then accessed on the world wide web when time comes for processing the document.

The anchor word identifier 510 receives the parsed document from the parser 505 or document storage 530, and a model (e.g., a business line model) from model storage 535. The anchor word identifier identifies each instance of an anchor word of the model in the parsed document. In some embodiments, the locations in the document of various anchor words are stored in volatile memory for use while the word pair identifier 515 evaluates the document.

In some embodiments, the anchor word identifier 510 performs a threshold measurement that prevents the document evaluation process from going any further if there are not enough anchor words in the document. A separate module performs this threshold evaluation in some embodiments. In some embodiments, the threshold number of anchor words is stored as a parameter in the model.

The word pair identifier 515 receives the model information either from the anchor word identifier 510 or from model storage 535. The word pair identifier receives document information from the parser 505 or storage 530, and the anchor word location information from the anchor word identifier 510. The word pair identifier uses the anchor word locations and the context definition from the model to identify all context words for each anchor word in the document.

The document score calculator 520 receives the model (from word pair identifier 515 or storage 535) and the identified word pairs from the word pair identifier 515 and calculates a score for the document. The score calculator 520 looks up the score in the model for each received word pair (e.g., from patterns and associated scores 320 of model 310), and calculates a score for the document. As discussed above, the method for calculating the score may vary with different embodiments (e.g., an average of the scores, the median, the sum, etc.). The document score calculator 520 may store this model score in document database 540.

The document tagger 525 receives a relevancy score for the document from the document score calculator 520 or from the document database 540, and the business line model the document was scored for from the document tagger 525 or model storage 535, and determines whether the document score is above the threshold score for the model. If the document score is sufficient, the document tagger tags the document as related to the model.

The operation of the document analysis system 500 will now be described. The parser 505 receives a document from the document storage 530. The parser parses the document to identify all of its words. The anchor word identifier 510 then receives this information, along with a model from model storage 535, and identifies all of the anchor words of the particular model that are present in the document. If a sufficient number of anchor words are not present in the document, as determined by the occurrence threshold of the model, the anchor word identifier stops the evaluation process.

The word pair identifier 515 then receives the model, the list of anchor words, and the parsed document information. The model's context definition is used to determine all of the context word pairs for each of the anchor words and to associate the context words to the anchor words as word pairs.

These word pairs are sent to the document score calculator 520, along with the model. The document score calculator 520 uses the model to calculate a document score that quantifies the relevancy of the document to the category for which the model is defined. As noted above, the document score may be an average or other function of the various word pair scores. The document score is sent to the document tagger 525. The document tagger 525 determines whether the score is high enough that it should be recorded in the document database 540. When the score is high enough, the document tagger 525 stores the score information and tags the document as relevant to the category in document database 540.

The above illustrates only one example of a document evaluation system. Different embodiments may have different or additional modules, and the flow of data may be different in some embodiments. In addition, other types of models that use different patterns of document elements and/or different scoring may be used in some embodiments.

Figure 6:
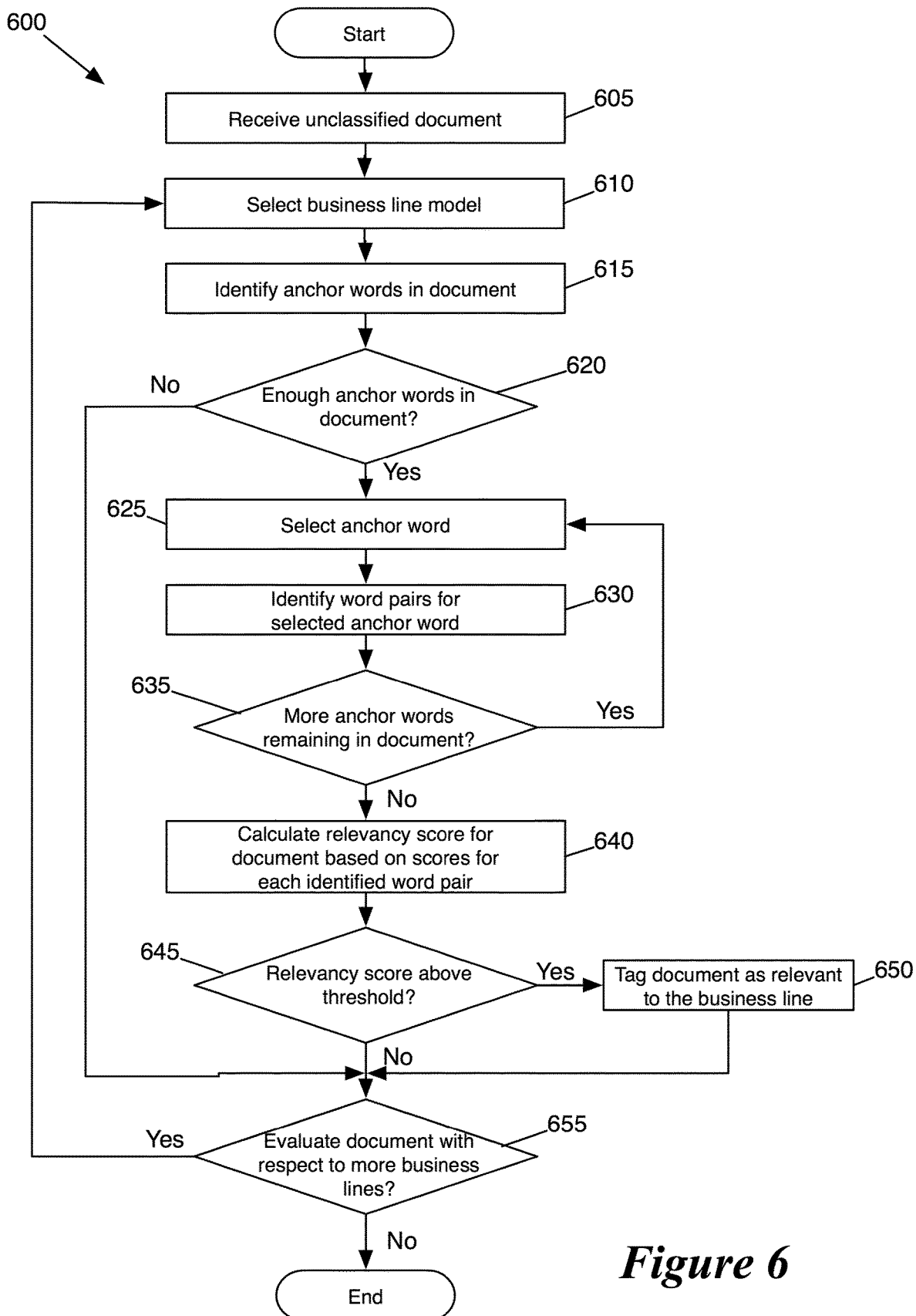
FIG. 6 conceptually illustrates a process of some embodiments for classifying a document for relevancy to a set of business lines.

FIG. 6 conceptually illustrates a process 600 for classifying a document for relevancy to a set of business lines. In some embodiments, a system (e.g., system 500) performs this process each time a new document is received in order to determine the relevancy of the document to each business line stored by the system. One of ordinary skill in the art will recognize that process 600 is only one of many possible processes for determining whether a document is relevant to a set of business lines. In addition, one of ordinary skill will recognize that similar processes are applicable to other categories, such as companies (e.g., using company models).

As shown, the process 600 begins by receiving (at 605) an unclassified (i.e., new) document. This may be a document published on the world wide web and detected by a crawler. In some embodiments, the process 600 is executed when a new document is retrieved and stored in a storage. In some embodiments, the process 600 is executed in real time, processing each document as it is stored in the storage, while in others it runs as a batch process, such as running at certain time intervals, and processes each of the documents that may have been stored since its previous execution.

The process 600 then selects (at 610) a business line model (e.g., from model storage 535). As mentioned, in some embodiments the document is evaluated by many models—tens of thousands or more. The models are selected in a specific order in some embodiments (e.g., alphabetically, by creation date, etc.), while other embodiments randomly select the order in which the models evaluate a new document. Some embodiments may select a business line that is of similar nature (e.g., in the same industry) as a business line model that was previously determined relevant to the document (e.g., if the document was determined relevant to the business line of notebook computers, some embodiments may choose desktop computers as the next business line). As discussed above, in some embodiments, each business line model includes patterns (e.g., word pairs)

and associated scores as well as parameters for analysis (e.g., a context definition, a minimum key word occurrence threshold, a default score for new pairs, etc.).

The process 600 then identifies (at 615) all anchor words in the document. Some embodiments parse the document to identify all of the words, and store the parsed results in a storage (e.g., volatile memory such as RAM or non-volatile memory such as a hard disk, solid-state memory, etc.). The parsed results are examined to identify all occurrences of each of the selected model's anchor words. In some embodiments, this operation is performed by modules such as the parser 505 and/or anchor word identifier 510.

The process 600 next determines (at 620) whether the document has enough anchor words to be evaluated using the currently selected model. Some embodiments use the occurrence threshold defined as a model parameter as the threshold number to determine whether there are enough anchor words in the current document. When there are not enough anchor words for the current model, the process does not evaluate the document with the current model and proceeds to 655 to determine whether the document should be evaluated for relevancy to any further business lines.

Otherwise, when enough anchor words are present, the process selects (at 625) one of the anchor words identified in the document. Some embodiments select the anchor words in the order in which they are found in the document. Other embodiments select the anchor words in alphabetical order (with multiple instances of the same anchor word ordered based on appearance in the document), or select the anchor words in a random order.

The process 600 then identifies (at 630) the word pairs for the selected anchor word. That is, the process identifies all of the words in the context of the selected anchor word based on the context definition for the business line model. As described above, this may be a proximity threshold that specifies a distance, in number of words, from the anchor word. Other contexts can include words that are in the same sentence or paragraph, and may be specific to the anchor word or type of document.

After the word pairs for the selected anchor word are identified, the process 600 determines (at 635) whether any more anchor words remain that need evaluation. When another anchor word remains, the process returns to 625 to select the next anchor word and identify all of its context words.

When all of the word pairs in the document have been identified for all of the anchor words, the process 600 calculates (at 640) a relevancy score for the document based on the scores in the business line model for each of the identified word pairs. In some embodiments, this calculation is performed by the document score calculator 520 of FIG. 5. Different embodiments score the documents differently. For example, some embodiments use an average (i.e., arithmetic mean) of the scores for all of the identified word pairs. Some embodiments, rather than using the average of all of the word scores, use the median pair score, the maximum pair score, or the minimum pair score. Other embodiments may use other methods. In some embodiments, before calculating any function (e.g., mean, median, etc.), outlier scores are thrown out.

After the process 600 has calculated a score for the document's relevancy to the current business line model, the process determines (at 645) whether the calculated relevancy score is above a particular threshold (i.e., whether the document should be associated with the current model). Some embodiments set the threshold at zero, so that any document that is given a positive score is associated with the business line. Other embodiments use a higher threshold in order to filter out the documents.

When the document's score is above the threshold, the process tags (at 650) the document as relevant to the current business line (e.g., using document tagger 525). A relevant document's relationship and relevancy score is stored in a storage, such as a database. Other embodiments use other mechanisms to store document data. For instance, some embodiments store an XML file or similar data storage structure for each document, and use business line and score tags to store the relevancy information in the data storage structure.

The process 600 then determines (at 655) whether the current document should be evaluated with respect to any more business lines. When more business lines remain, the process returns to 610 to select another business line. Once the document has been evaluated for every business line in the system, the process ends (although the process will be performed again for the next document).

As mentioned, some embodiments perform a process similar to process 600 for other categories, including companies. As such, documents are evaluated for relevancy to each business line and each company (as well as other entities) in the system of some embodiments. This information is stored in a database in some embodiments.

Figure 7:
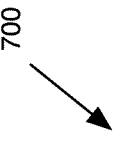
FIG. 7 illustrates a data structure (e.g., a database) of some embodiments for storing information about a set of documents.

FIG. 7 illustrates a data structure (e.g., a database) 700 of some embodiments for storing information about a set of documents. The data structure 700 illustrates the document information after the documents have been evaluated for relevancy to numerous categories, including companies and business lines. Each document includes a tag (i.e., a business line or company to which the document is relevant) and a score for the tag. The information stored in such a database is used by the system of some embodiments to identify associate companies to business lines.

IV. Business Line Analysis

As mentioned, some embodiments identify a set of business lines for each company. The set of business lines indicates in which fields of goods and services the company operates. In order to identify the business lines for a particular company, some embodiments evaluate the number of documents that are tagged with both the particular company and a particular business line. When a threshold number of documents are co-tagged (which may vary by business line), some embodiments tag the company with the business line. In addition, some embodiments sort a company's business lines to identify the most important business lines of the company. This data may be used to display information about the company to a user.

Figure 8:
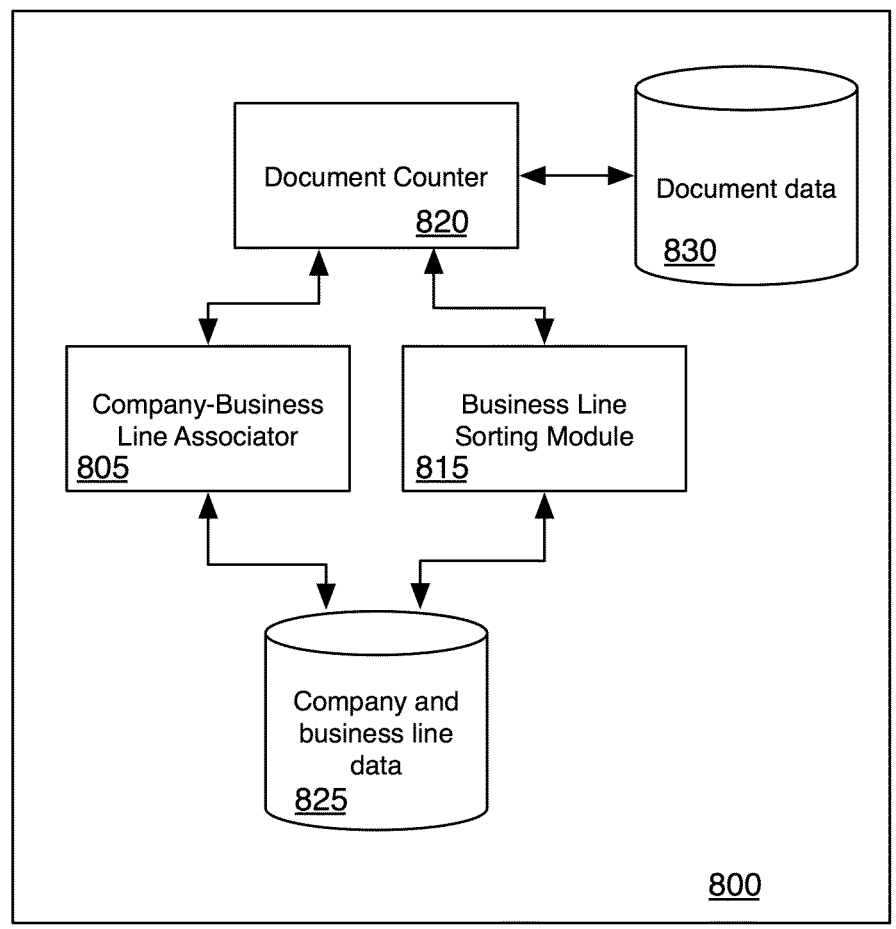
FIG. 8 conceptually illustrates the software architecture of a system for identifying a set of business lines for a company and sorting the business lines.

FIG. 8 conceptually illustrates the software architecture of a system 800 for identifying a set of business lines for a company and sorting the business lines. The system 800 includes a company-business line associator 805, a business line sorting module 815, and a document counter 820.

The system 800 also includes company and business line data 825 and document data 830. In some embodiments, the company and business line data 825 includes data structures that store information for each company and each business line in the system. This information may be stored in one or more databases (e.g., a database of business lines and a database of companies). In some embodiments, the document data 830 is a database listing each document retrieved by the system (e.g., retrieved from the world wide web by a webcrawler) and the categories (including business lines and companies) to which the document has been tagged as relevant (e.g., by process 600, described above). FIG. 7, described above, illustrates an example of such a database.

In some embodiments, storages 825 and 830 are one physical storage. In other embodiments, both may be in different physical storages, or may be split between storages. Furthermore, some embodiments may split one of the illustrated storages across numerous physical storages (e.g., there may be so many documents that numerous storages are required to store copies of all of them).

The document counter 820 of some embodiments identifies the number of documents related to both a particular company and a particular business line. In some embodiments, the document counter receives a pairing of a company and a business line from either the company-business line associator 805 or the business line sorting module 815 and queries the document data 830 to determine the number of co-tagged documents for the pairing. This information is then returned to the requesting module.

The company-business line associator 805 associates business lines with companies. In some embodiments, the associator 805 retrieves company and business line data from storage 825 and, for each company, determines whether each business line is a business line of the company. The associator sends a company-business line pairing to the document counter, which returns a number of co-tagged documents. The company-business line associator then determines whether the number of documents is above a particular threshold for the business line. In some embodiments, the associator 805 stores a list of business lines and the different thresholds of co-tagged documents for each of the business lines to be associated with a company. In other embodiments, this information is stored in a model for the business line, which is retrieved by the associator 805. In yet other embodiments, the threshold does not vary between the different business lines, and a single threshold is stored. When the number of co-tagged documents for a pairing is above the threshold, the company-business line associator 805 stores the association in the storage 825. In some embodiments, this information is stored by tagging the business line to a data structure for the company.

The business line sorting module 815 identifies a list of business lines tagged to a particular company and sorts the business lines by their import to the company. In some embodiments, this entails retrieving information about each company from the storage 825, and using the document counter to identify the number of documents from one or more particular time periods that are co-tagged with company and each particular business line. Based on these counts of co-tagged documents, the business line sorting module 815 determines an order of importance of the business lines to the company. Some embodiments sort the business lines of a company by the total number of documents co-tagged with the company and the business lines. Other embodiments use more complicated comparisons based on historical numbers of co-tagged documents to sort the business lines. Some embodiments store this order information in the storage 825, in the data structure for the company.

The system 800 represents only one example of a business line evaluation system. While many of the features have been described as being performed by one module (e.g., the company-business line associator 805 or business line sorting module 815), one of ordinary skill would recognize that the functions might be split up into multiple modules, and the performance of one feature might even require multiple modules. In addition, some embodiments will include additional, different modules.

A. Associating Business Lines with Companies

Figure 9:
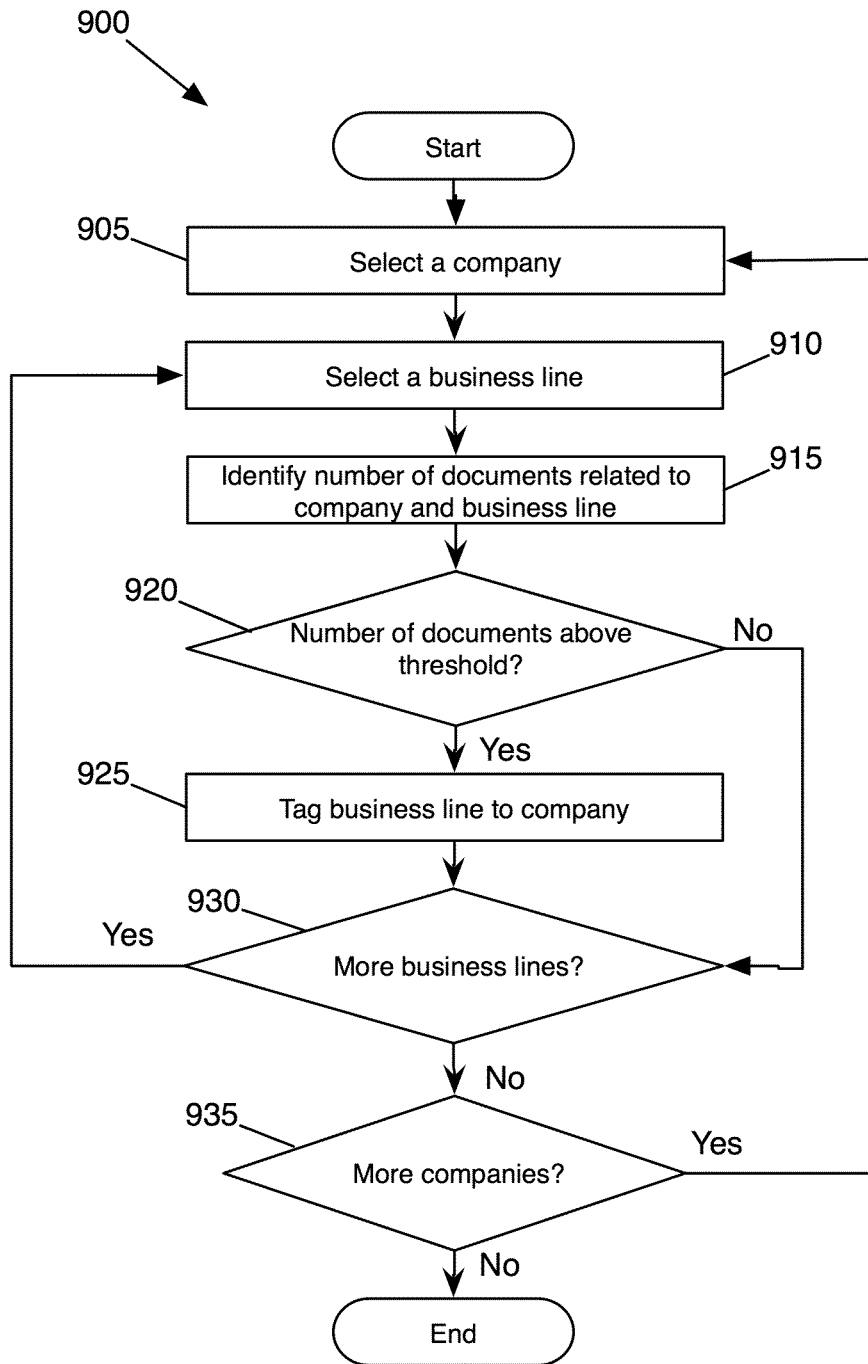
FIG. 9 conceptually illustrates a process for associating one or more business lines with one or more companies.

As mentioned, some embodiments associate business lines with companies, then sort the business lines for each company once the business lines are identified. FIG. 9 conceptually illustrates a process 900 for associating one or more business lines with one or more companies. In some embodiments, the system 800 performs this process (or a similar process) to analyze the set of companies to determine their association with the set of business lines. In some embodiments, process 900 is repeated until every business line is analyzed for every company.

In some embodiments, the process 900 relates business lines to companies by analyzing documents that were tagged as relevant to the companies and business lines (e.g., documents tagged by process 600, described above in Section III). The process 900 outputs an identified relationship between a company and a business line when a sufficient number of documents are tagged as relevant to both the company and the business line.

In some embodiments, the process 900 is executed after documents are tagged and stored (e.g., after the system 500 evaluates a set of documents). In some embodiments, the process 900 is executed as tagged documents are stored while in other embodiments process 900 is run as a batch process at certain time intervals (e.g., executed for each company on a daily, weekly, or monthly basis).

As shown, the process 900 begins by selecting (at 905) a company from a set of companies. The order of selection of the company varies with some embodiments. Some embodiments may select the companies in alphabetical order while others may select them randomly. The company is selected from a data structure, such as a database, a text file or an XML file listing the companies, etc. In some embodiments, a set of base companies for which business lines are determined manually are not included in the list of companies. Other embodiments use process 900 to refine the set of business lines for the companies.

The process 900 then selects (at 910) a business line. In some embodiments, when the process has been run previously such that the company is associated with a set of business lines, these business lines are not evaluated again for the company. Other embodiments re-evaluate these business lines for the company.

With a selected company and business line, the process 900 identifies (at 915) the number of documents that are tagged as relevant to both the company and the business line. In some embodiments this involves querying a document database to identify the number of documents with scores above a certain threshold for both the selected company and the selected business line (e.g., using document counter 820).

The process 900 determines (at 920) whether the number of documents tagged as relevant to both the company and the business line is above a threshold number for the particular business line. The process 900 of some embodiments imposes a threshold value because if only a single document out of many is relevant to both to a business line and a company, it is unlikely that the company is in that line of business. Thus, the process 900 of some embodiments requires that a threshold number of documents be tagged as relevant to the company and the business line before the business line is associated (i.e., related or tagged) to the company.

The threshold number of documents required to relate a company with a business line varies in some embodiments. In some embodiments, the threshold varies based on the industry of the business line, as some industries are more likely to include background noise in the tags and therefore a higher threshold is used to reduce false associations. The financial industry is one example of an industry for which a higher threshold might be desirable. For instance, merger and acquisition activity between two tech companies (e.g., Microsoft and Yahoo) could lead to a document being tagged as relevant to one or both of the companies as well as the business line of merger financing. With a lower threshold, one or both of the tech companies involved in the merger could be tagged as operating in the merger financing business, and thus a higher threshold may be used. In addition, some embodiments set higher threshold for particular companies that are expected to be involved in such industries—thus, the system might use a higher threshold to associate a business line with the merchant bank involved in the merger. In some embodiments, when a company is tagged as operating in a financial business line (e.g., merger financing), then its threshold for being tagged with any other business lines is increased. The financial industry is only one example of an industry for which the association threshold could be adjusted; similar adjustments may be made for other industries as well.

In addition, some embodiments base the threshold number of documents on the total number of documents evaluated. Thus, when the document database includes, for example, one million documents, a different threshold of co-tagged documents is required than when the document database includes three thousand documents. Some embodiments use a threshold based on the number of total documents tagged to a company. For instance, a small startup company may have a very small number of documents tagged as relevant to the company. However, if 95% of these documents are also tagged as relevant to a business line, it is likely that the startup company operates in that business line.

When the number of documents is above the threshold for the business line-company pairing, process 900 tags (at 925) the company with the business line. In some embodiments, this entails storing a reference to the business line in a data structure for the company (e.g., storing the reference to the business line in a field of a database entry for the company). Some embodiments also store a reference to the company in a data structure for the business line, such that a list of all companies operating in the business line is easily available.

The process 900 then determines (at 930) whether there are any further business lines to be evaluated for the currently selected company. As mentioned above, some embodiments cycle through each business line stored in the system for each company to determine whether to associate the business line with the company. When more business lines remain to be evaluated for the selected company, the process returns to 910 to select the next business line to be evaluated for the company.

When all business lines have been analyzed for the company, the process 900 proceeds to determine (at 935) whether there are any further companies remaining for which business lines should be evaluated. Some embodiments run through process 900 for each company stored in the system, which may be thousands of companies. When more companies remain, the process returns to 905 to select the next company. When all companies have been evaluated, the process ends.

Some embodiments may raise a flag if the process does not identify any business lines for a company. In some embodiments, an administrator or editor of the system is then notified to manually identify and enter business lines for the company. Some embodiments may re-run the process 900 after a specified period of time once more documents are evaluated for a company with no associated business lines. In addition, some embodiments perform process 900 periodically to update the company and business line relationships as new documents are obtained and evaluated.

Figure 10:
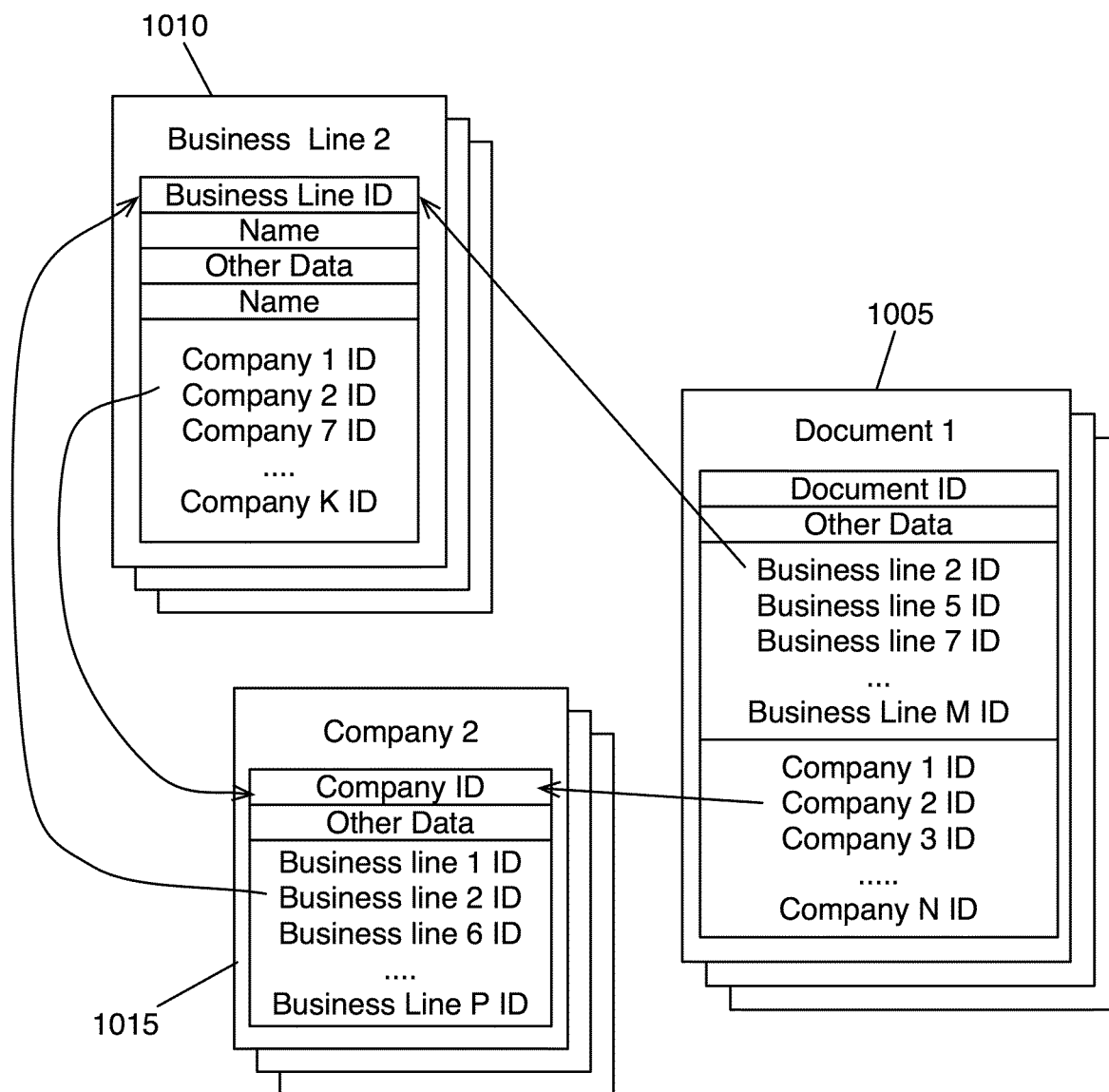
FIG. 10 conceptually illustrates the data structures of some embodiments for business lines, companies, and documents.

FIG. 10 conceptually illustrates the data structures of some embodiments for business lines, companies, and documents. A document data structure 1005 includes a document ID and a list of business lines and companies to which the document is relevant. The document data structure 1005 also includes other data, such as other entities to which the document has been tagged as relevant. In some embodiments, the list of business lines and companies includes references to the data structures for the business lines and companies. For example, the reference for business line 2 refers to the data structure 1010 for business line 2.

The data structure 1010 includes a business line ID, a name for the business line, other data (e.g., alternative names for the business line, a threshold for associating the business line with a company, etc.), and a list of companies associated with the business line. In some embodiments, this list of companies includes references to the data structures for the companies. For instance, the reference for company 2 refers to the data structure 1015 for company 2.

The data structure 1015 includes a company ID, other data (e.g., competitors of the company, stock information about the company, etc.), and a list of business lines in which the company operates, as determined by a process such as that described above. In some embodiments, this list of business lines includes references to the data structures for the business lines. For instance, the reference to business line 2 refers to the data structure 1020. In some embodiments, these references are stored as pointers to the other data structures.

B. Ordering of Identified Business Lines

Once a company is associated with its business lines, the system of some embodiments generates additional data such as the order of importance of the various business lines to the company. For example, one business line may provide a company with the majority of its revenue while another business line is minor or incidental, not providing significant revenue. When the information in the system is displayed to users (as described below), it may be useful to indicate the relative importance of the company's different business lines.

Figure 11:
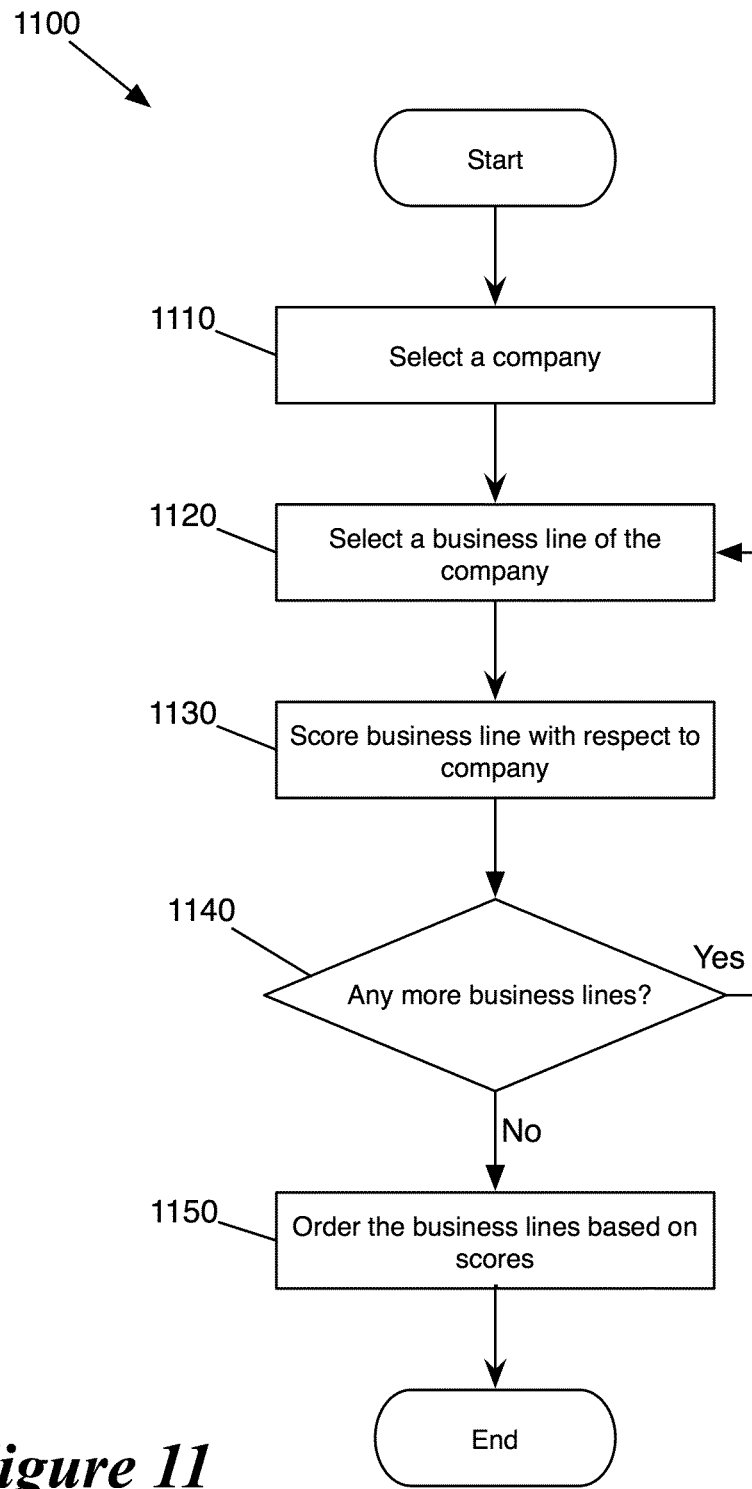
FIG. 11 conceptually illustrates a process of some embodiments for ordering the business lines for a company.

FIG. 11 conceptually illustrates a process 1100 of some embodiments for ordering the business lines for a company. Some embodiments perform the process 1100 for each company for which more than one business line is identified (e.g., by process 900). The process 1100 begins by selecting (at 1110) a company. The company may be selected from a list of all companies or from a list of companies with more than one business line in different embodiments. The order of the selection also may vary from random selection to alphabetical order. The process 1100 selects (at 1120) a business line of the selected company. Some embodiments may select business lines in alphabetical order while other embodiments may choose business lines randomly.

The process 1100 scores (at 1130) the business line with respect to the company. Different embodiments use different factors to calculate a score for the business line. In some embodiments, the score is based on the number of documents in a set of documents that relate to both the company and to the business line. Some embodiments may limit the document set to a specified time period (e.g., the past three months, from one year ago to one month ago, etc.). Some embodiments may weigh different time periods differently. In addition, some embodiments store information about product releases, and will factor in the spike of documents associated with the product release (i.e., by discounting the number of documents from the time around the product release). In some embodiments, the time period may also be selectable by a user (e.g., a user may select a certain time period by interacting with a GUI, such as a calendar or a chart spanning a first period of time with two user interactive elements that are selectable to increase or decrease the desired time period).

In some embodiments, the calculation also factors in historical averages of documents related to both the company and the business line. For example, suppose a particular Company has had an average of 1000 documents relevant to both the particular company and the business line over each three month period in the past two years. The particular company then has 4000 documents co-tagged with the business line in the most recent three month period. Some embodiments lower the score of the business line for that company to compensate for the sudden increase of documents. For example, in some embodiments the process calculates the change in document count and uses that as a factor in lowering (or increasing) the score (e.g., halving the increase in document count). This protects the importance of business lines from being overly affected by sudden changes.

Various other embodiments use other factors in addition or instead of those just discussed. For example, some embodiments use external data about the company to rank the business lines. Data about the revenue of various products in the different business lines is available in some embodiments, and thus the score calculation factors in the relative percentages of company revenue from each of the business lines.

In some embodiments, the scores for the business lines are stored so that the system can keep a historical perspective of the business line score without being required to recalculate the scores regularly. Some embodiments store this information in the data structure for company (e.g., data structure 1015).

After a score for the business line is calculated, the process 1100 then determines (at 1140) whether any additional business lines for the selected company require analysis. When scores need to be calculated for additional business lines, the process proceeds to 1120 to select the next business line.

Once scores are calculated for all business lines of the company, the process 1100 orders (at 1150) the business lines for the company based on the scores, and ends. In some embodiments, the business lines are ranked in descending order of score (i.e., highest ranked first). This ordering represents the order of importance of the business line to the company. In some embodiments, the order of the business lines is stored in the data structure.

Figure 12:
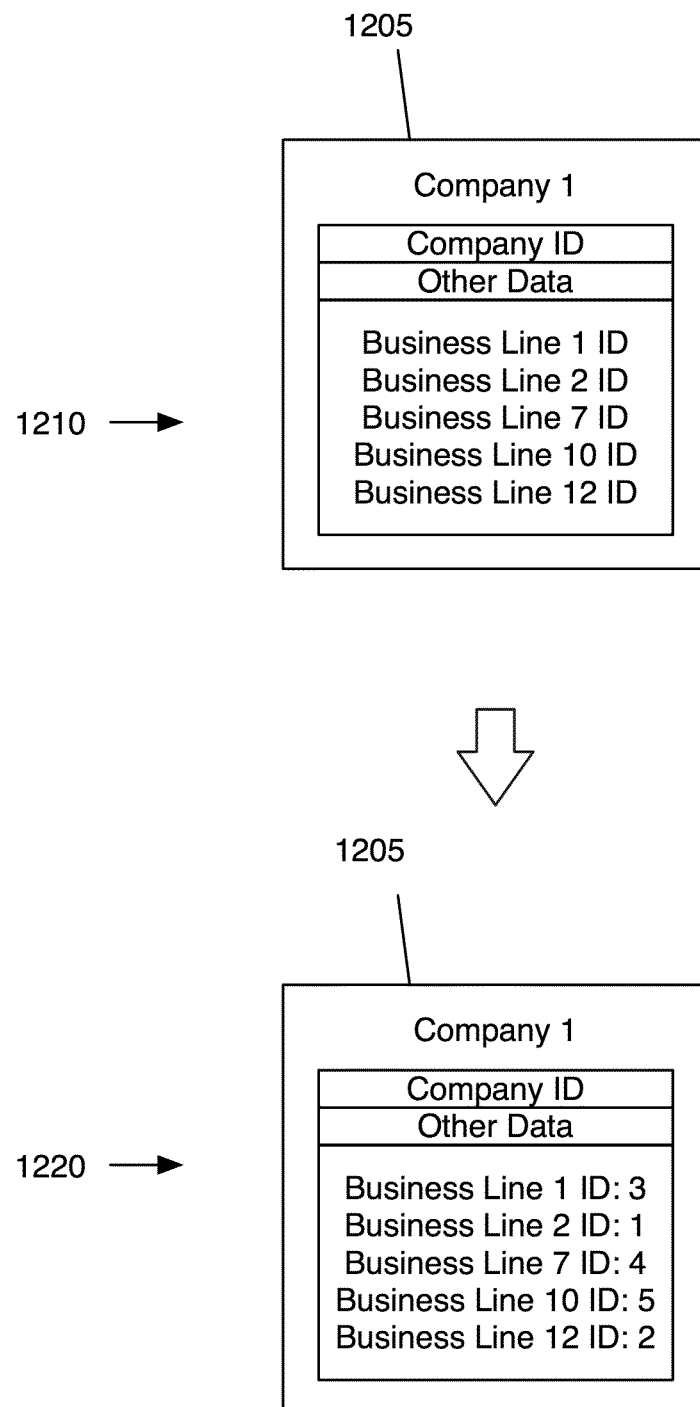
FIG. 12 illustrates a portion of a company data structure before and after the business lines of the company have been ordered.

FIG. 12 illustrates a portion of a company data structure 1205 before (at stage 1210) and after (at stage 1220) the business lines of the company have been ordered (e.g., by process 1100). The data structure 1205 lists the business lines of the company, in addition to other information described above with respect to FIG. 10. Based on the scores calculated for each business line, each business line is given a rank in the data structure at stage 1220. In this example, Business Line 2 has the highest score and is thus considered the most important business line, while Business Line 10 has the lowest score and is thus considered the least important business line.

V. Competitor Analysis

Within a business line, a company will usually compete with one or more other companies (unless the company has a complete monopoly in the business line). Often, a company will compete with some of its competitors in multiple business lines. Some embodiments automatedly determine (i) a set of competitors for each company and (ii) the order of importance of those competitors to the company. Some embodiments use the business lines data for each company to determine its competitors.

Figure 13:
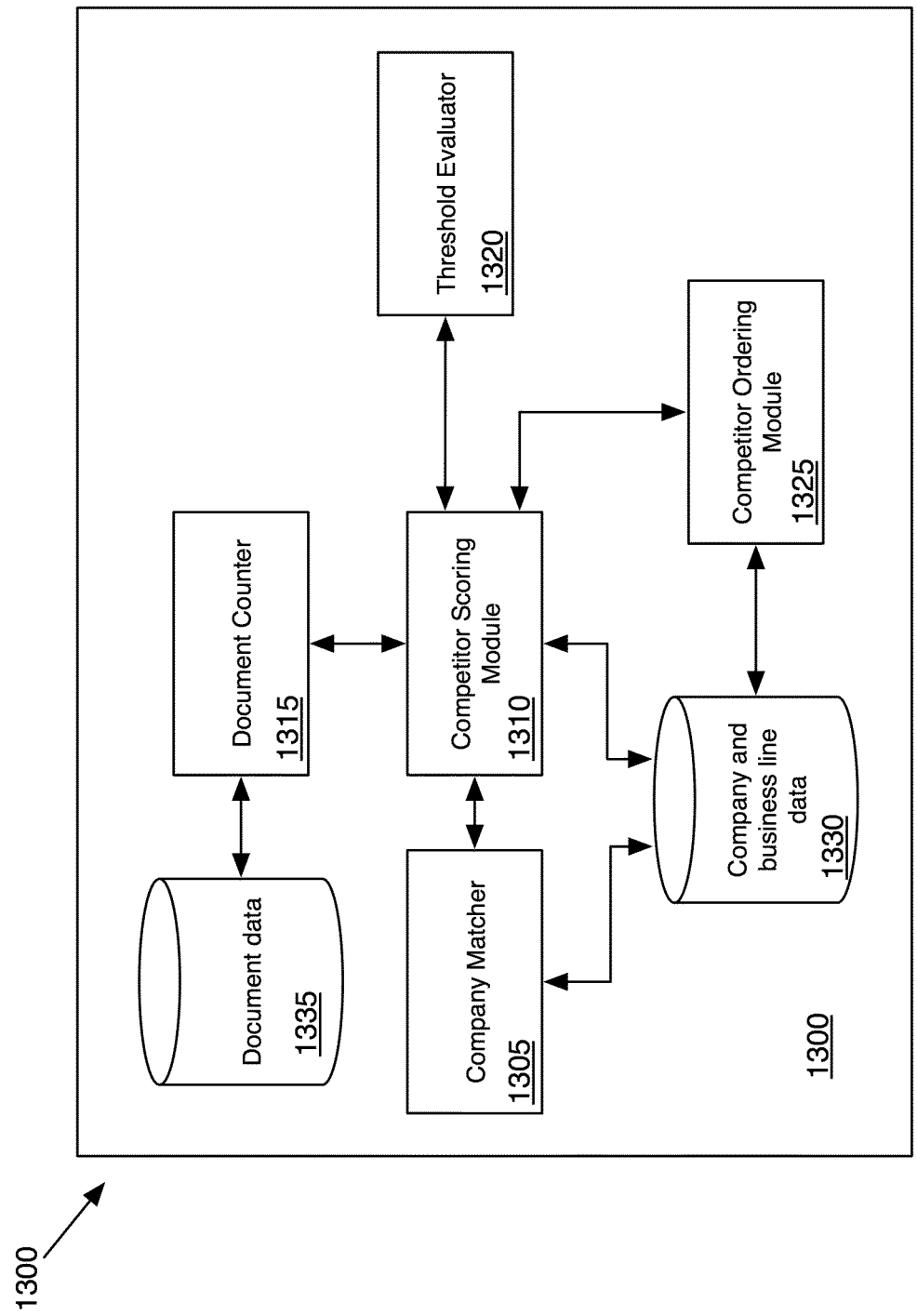
FIG. 13 conceptually illustrates the software architecture of a system that identifies and orders competitors of a set of companies.

FIG. 13 conceptually illustrates the software architecture of a system 1300 that identifies and orders competitors of a set of companies. The system 1300 includes a company matcher 1305, a competitor scoring module 1310, a document counter 1315, a threshold evaluator 1320, and a competitor ordering module 1325.

The system 1300 also includes company and business line data 1330 and document data 1335. This may be the same data as illustrated in FIG. 8; in fact the system 1300 and the system 800 of FIG. 8 may be part of the same overall system. In some embodiments, the company and business line data 1330 includes data structures that store information for each company and each business line in the system. This information may be stored in one or more databases (e.g., a database of business lines and a database of companies). In some embodiments, the document data 1335 is a database listing each document retrieved by the system (e.g., retrieved from the world wide web by a webcrawler) and the categories (including business lines and companies) to which the document has been tagged as relevant. FIG. 7, described above, illustrates an example of such a database.

The company matcher 1305 identifies potential competitors for a selected company. For a selected company, some embodiments identify each other company that shares at least one business line. In some embodiments, the business line data structures store a list of each company operating in the business line. Thus, the company matcher can identify a business line of the selected company from the selected company's data structure, then identify all other companies operating in the identified business line from the data structure for the business line. The company matcher 1305 passes a pairing of a first company and a second company (that is a possible competitor of the first company) to the competitor scoring module 1310.

The competitor scoring module 1310 calculates a competitor score for the second company to ascertain its importance to the first company as a competitor. The competitor score may be determined on a number of factors. Some embodiments identify the number of business lines in which the two companies compete, the relative importance of the business lines to the first company. To determine the relative importance of the business lines, some embodiments use the document counter 1315 (which may be the same as document counter 820 of FIG. 8) to determine the number of documents co-tagged with the first company and the business line. Some embodiments also use the document counter 1315 to determine the number of documents co-tagged with the two companies, which is another factor used by some embodiments of the competitor scoring module 1310 to determine a competitor score.

The threshold evaluator 1320 receives a competitor score from the scoring module 1310 and determines whether the score is above a threshold for listing the second company as a competitor of the first company. Some embodiments use a constant threshold, while other embodiments vary the threshold based on various factors. For instance, some embodiments require a higher threshold for a company operating in numerous business lines so that only the top competitors will be identified, rather than having hundreds of competitors.

When the competitor scoring module 1310 has evaluated all of the possible competitors for the first company (as determined by the company matcher 1305), the list of competitors and scores is sent to the competitor ordering module 1325. The competitor ordering module 1325 orders the competitors and stores the ordered competitor information in the company data 1330. In some embodiments, the ordered list of competitors for the first company is stored in the data structure for the first company.

Figure 14:
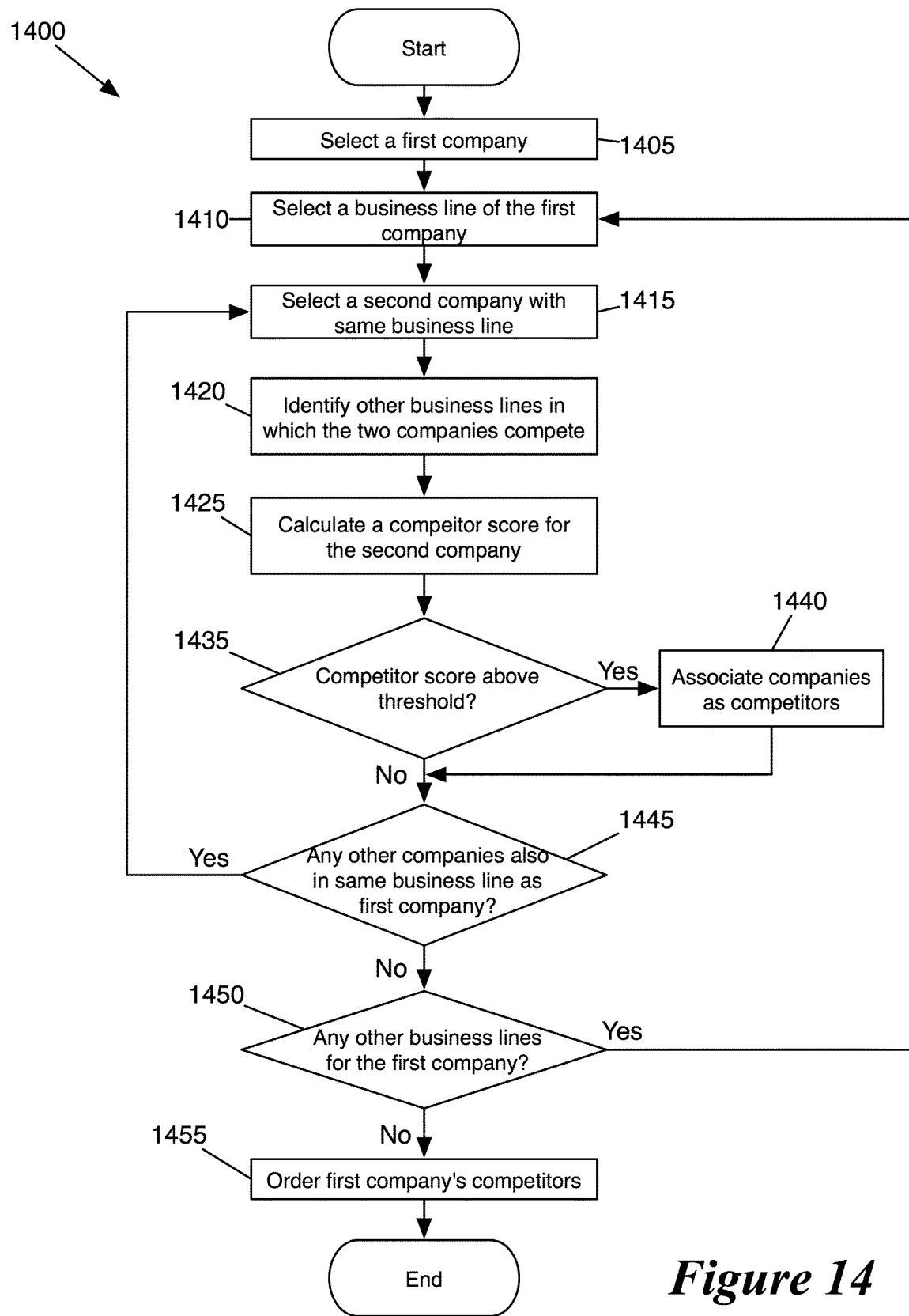
FIG. 14 conceptually illustrates a process of some embodiments for identifying and ordering competitors of a selected company.

FIG. 14 conceptually illustrates a process 1400 of some embodiments for identifying and ordering competitors of a selected company. In some embodiments, the system 1300 performs process 1600. Some embodiments perform process 1400 whenever processes 900 and/or 1100 (or similar processes) are performed to identify and order business lines, as a company's business lines are used to identify competitors of a company. Some embodiments periodically update competitive relationships and therefore periodically run process 1400.

As shown, the process 1400 begins by selecting (at 1405) a company for which competitors will be analyzed. Some embodiments perform process 1400 for each company in the system for which at least one business line is identified. The process then selects (at 1410) a business line in which the first company operates. Some embodiments use a stored data structure (e.g., a database entry) for the company to identify the company's business lines. When the first company is not associated with any business lines, some embodiments use a process such as process 900 to identify business lines for the company.

The process 1400 then identifies (at 1415) a second company that also operates in the selected business line. Some embodiments identify the companies which operate in a business line from a data structure for the business line (e.g., a database entry). When there are multiple companies operating in the business line, different embodiments select the companies in different orders (e.g., randomly, alphabetically, etc.). In some embodiments, a module such as the company matcher 1305 performs the above operations to identify potential competitors for the first company.

Next, the process identifies (at 1420) other business lines in which the two companies compete. Some embodiments compare the business lines stored in the first company's data structure with the business lines stored in the second company's data structure to identify the overlapping business lines.

The process 1400 then calculates (at 1425) a competitor score for the second company. Different embodiments calculate this score differently. Some embodiments increase the score when the number of business lines in which both companies operate is larger. Some embodiments factor in the relative importance of the business lines to one or both of the companies. For instance, when the second company operates in the most important business line of the first company, this may be more important of a competitor than a different company that operates in the two least important business lines of the company. The number of companies operating in each business line is a factor used by some embodiments. When there are fewer companies in a business line, the few competitors in the business line will often be very important competitors for the first company.

Some embodiments calculate a score for each overlapping business line based on the relative importance of the business line and/or number of companies in the business line, and sum all of the scores for the overlapping business lines to determine a competitor score. In order to identify the relative importance of the business lines, some embodiments access the business line and company data structures. In addition, the document data may need to be accessed in order to identify the relative importance of the business lines if this is not stored in the company data structure.

The process then determines (at 1435) whether the competitor score is above a particular threshold. Some embodiments use a single threshold for all companies determined by an administrator of the system. Other embodiments vary the threshold, for instance to require a higher threshold for a company operating in numerous business lines so that only the top competitors will be identified, rather than having hundreds of competitors. In addition, a company that only operates in one business line may not generate scores as high (depending on how the relative importance of the business line factors in to the score), so some embodiments use a lower threshold when a company has fewer business lines.

When the competition score is above the threshold, the process 1400 associates the selected potential competitor as a competitor of the first company. Some embodiments store this information in the data structure for the selected company once the process determines that the competition score is above the threshold. Other embodiments store the association and competition score in temporary storage, such as RAM, until the competitors can be ordered. The competitor association is a one-way relation in some embodiments. That is, company A may be listed as a competitor of company B even if company B is not listed as a competitor of company A. Some embodiments store a two-way relation (i.e., when company A is associated as a competitor of company B, company B is automatically determined as a competitor of company A).

The process then determines (at 1445) whether there are any other companies in the currently selected business line of the first company. When the current business line is not the first business line to be evaluated for the first company, some companies that operate in the business line may have already been evaluated for a competitive relationship with the first company on account of competing in a different business line that was already evaluated. Some embodiments keep track of which companies have been evaluated as potential competitors, whether associated with the first company as a competitor or not, and avoid wasting resources by evaluating a potential competitor more than once.

When additional potential competitors remain in the currently selected business line, the process 1400 returns to 1415 to evaluate another company as a potential competitor. When all companies tagged as operating in the business line have been evaluated, the process determines (at 1450) whether the first company operates in any other business lines. When additional business lines remain that could hold potential competitors, the process returns to 1410 to select a new business line and evaluate potential competitors in the new business line.

When all business lines (and thus all potential competitors) have been evaluated, the process 1400 orders (at 1450) the first company's competitors. Some embodiments order the competitors based on the competition scores for those competitors. In addition, some embodiments impose a maximum on the number of competitors (e.g., 100). When more than the maximum number of competitors are above the threshold score, only the top competitors (e.g., top 100) are stored as competitors of the first company after ordering. Other embodiments do not impose any cap on the number of competitors of a company. The order of the competitors is stored in the data structure for the first company, and is used in the later display of information about the first company to users of the system.

After ordering the competitors of the first company, the process 1400 ends. Some embodiments perform the process for each company stored in the system, which may be thousands of companies. The process 1400 may run periodically in some embodiments to re-order competitive relationships, determine new competitive relationships or remove companies that are no longer competitors.

Figure 15:
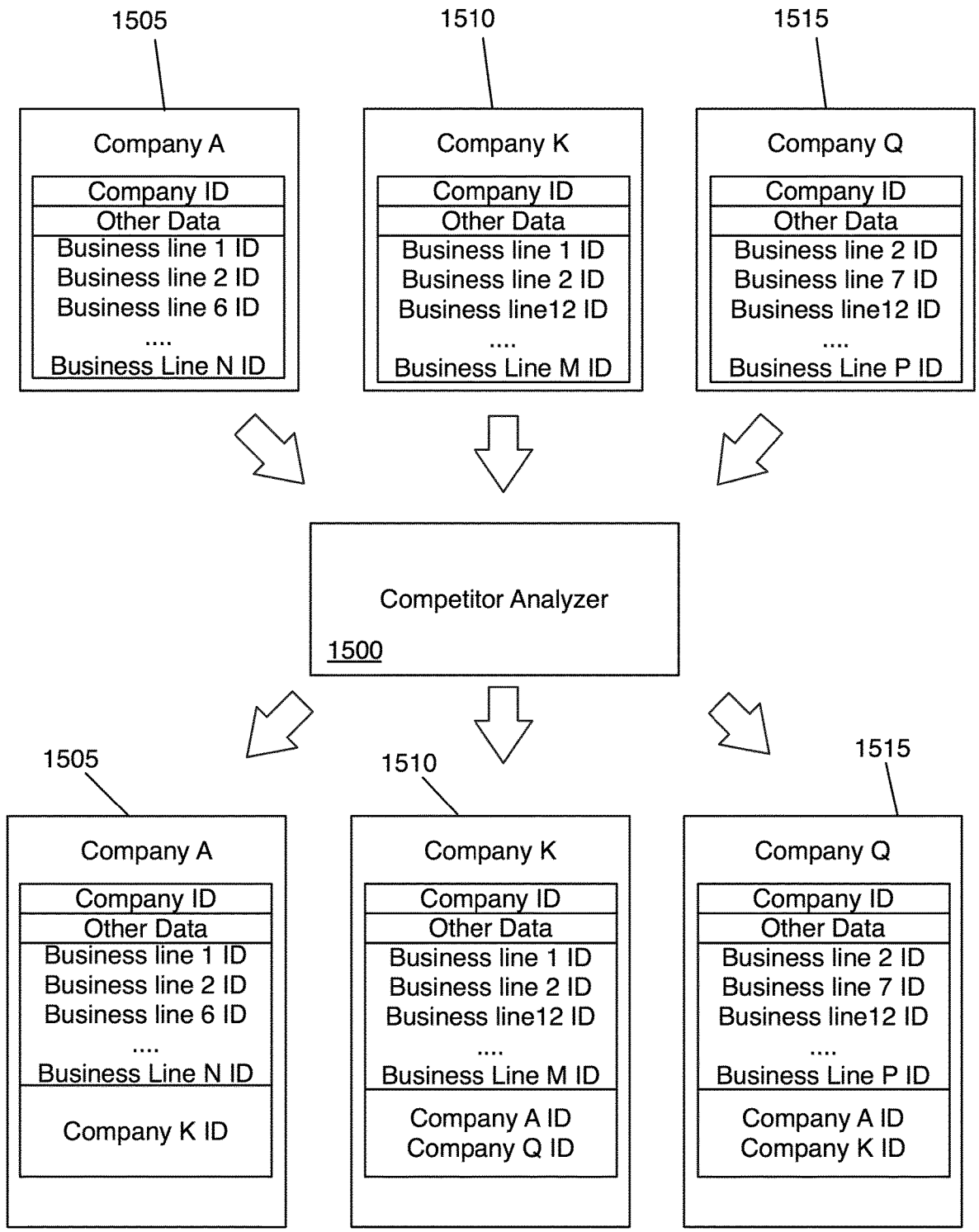
FIG. 15 illustrates an example output scenario of a competitor analyzer.

FIG. 15 illustrates an example output scenario of a competitor analyzer 1500 (e.g., a module or system that performs process 1400, such as system 1300). Three company data structures 1505, 1510, and 1515 for companies A, K, and Q are input into the competitor analyzer 1500. The competitor analyzer determines the competitors of each of the three companies.

As shown, the input data structures include a list of business lines in which each of the companies operates. After the competitor analyzer 1500 identifies competitors for the different companies, this information is stored in the data structures 1505-1515. As shown, company A lists only company K (and not company Q) as a competitor, while companies K and Q each list the other two companies as competitors. Due to, for example, company A operating only in business lines with company Q that are not especially important to company A, the competition score for company Q as a competitor of company A is not high enough. This will often happen with a larger company that operates in many business lines and a smaller company that operates in only one business line. When the small company's business line is of minimal importance to the larger company, the smaller company may not be an important competitor of the larger company. On the other hand, to the smaller company, the larger company that operates in its only business line is a very important competitor.

VI. Displaying Business Line and Competitor Information

In some embodiments, the business line and competitor data is used for displaying comprehensive information about a chosen entity to a user. Some embodiments perform the document evaluation and business line and competitor analysis on the back-end of a system, the front end of which is accessed by independent users to perform research about various entities (e.g., the companies and business lines). In some embodiments, when a user searches for information about a company (e.g., through a web-based interface in a web browser), the user is presented with a graphical user interface (GUI) that displays information about the company to the user. This information includes the business lines in which the company operates and the competitors of the company.

Figure 16:
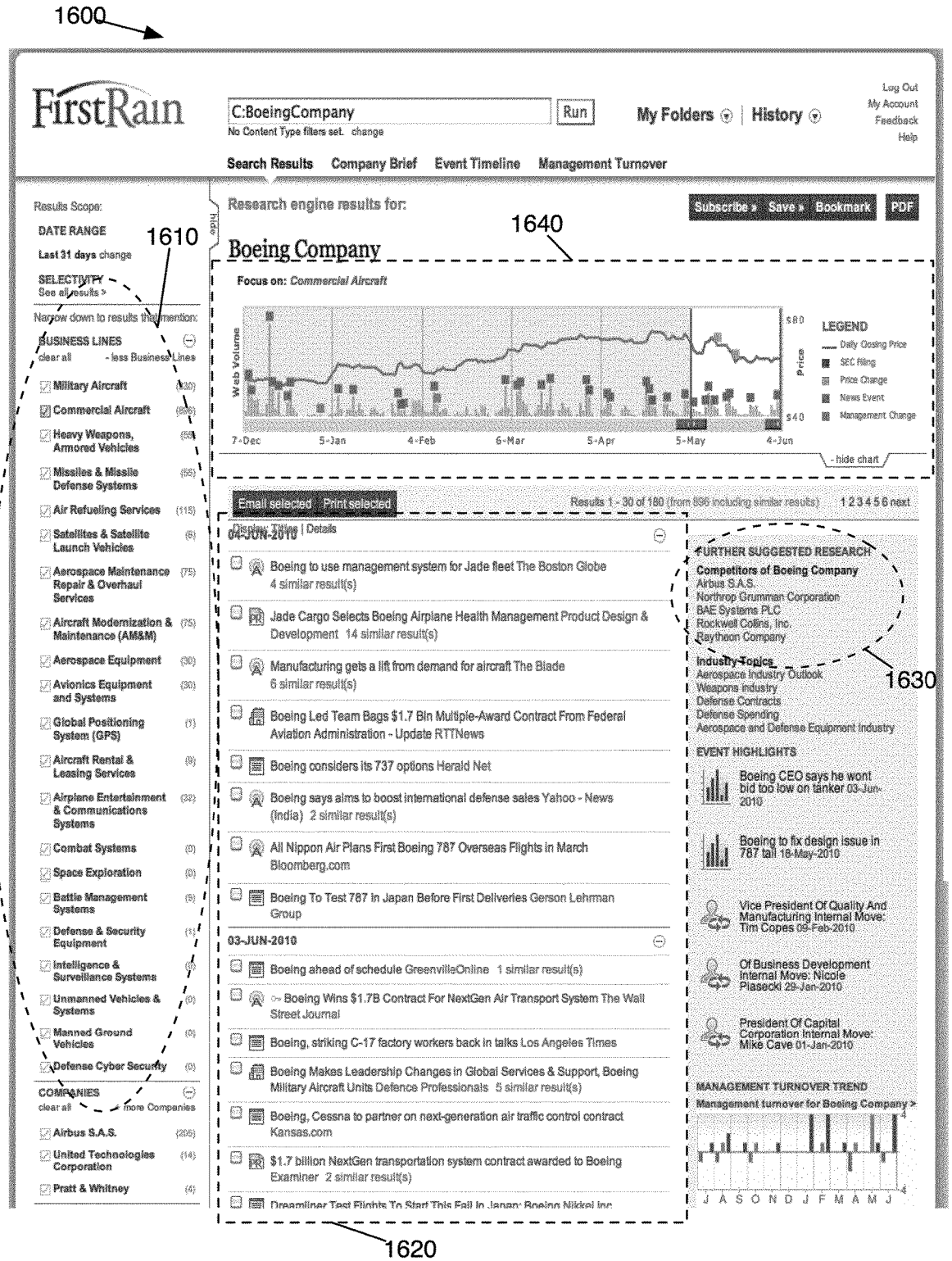
FIGS. 16-17 illustrate an example of a GUI for presenting information about a chosen company.

FIG. 16 illustrates an example of such a GUI 1600 for presenting information about a chosen company. The GUI 1600 includes a business line display area 1610, a document display area 1620, a competitors display area 1630, and a company timeline 1640. In this example, the information is presented for the Boeing Company, as indicated at the top of the display area.

The business lines display area 1610 displays a list of selectable business line items for the chosen company. Each business line item is selectable to provide more information about the company's operations in the business line. In some embodiments, the business line items are ordered from top to bottom by the importance of the business line to the company. In this example, Military Aircraft and Commercial Aircraft are listed as the two most important business lines for Boeing. In some embodiments, the business lines display area 1610 initially only displays a few business lines (e.g., 5-10) until expanded by the user, so as to not monopolize real estate in the GUI 1600. In FIG. 16, the display area 1610 has been expanded by the user.

In addition to being selectable to provide more information about the company's operation in a business line, the selectable items are also selectable to provide general information for the business line in some embodiments. For instance, selecting a checkbox in some embodiments will filter information on the company page to be specific to the business line, while clicking on the text of the business line will navigate to a new page for the business line generally.

The document display area 1620 lists links to documents that have been tagged as relevant to the chosen company (i.e., Boeing). A user can click on one of the documents to open a new web page or tab (or navigate in the current browser window) displaying the document available on the world wide web.

Various mechanisms are provided to filter the documents displayed in the document display area 1620 further than just providing all documents relevant to the company. For instance, selecting the selectable business line items can narrow the documents down to only show documents relevant to those business lines (and the company). In FIG. 16, the user has selected the "Commercial Aircraft" item such that all of the documents listed in display area 1620 are related to Boeing's operations in the commercial aircraft business line. In addition, document results can be narrowed by date, using the company timeline 1640. By default, some embodiments display the most recent documents within the date range first.

The competitors display area 1630 displays a list of the selected company's competitors as selectable items. In some embodiments, these companies are ordered based on the calculated importance as competitors to the selected company (i.e., Boeing). As displayed, the most important competitor of the Boeing Company is Airbus S.A.S. In some embodiments, selecting a particular business line selectable item will narrow the displayed competitors to only competitors in the selected business line. In addition, as with the business lines display area 1610, in some embodiments the competitors display area 1630 is expandable to list more competitors. Furthermore, some embodiments allow the user to narrow the documents displayed in display area 1620 to only include documents that are tagged to the competitor company as well as the chosen company.

The company timeline 1640 is a graph that displays information about the company over a period of time. In the example, the displayed time period is the previous six months. The displayed information includes the stock price for the company (if the company is publicly traded), various events (e.g., SEC filings, news events, management changes, etc.). In some embodiments, these events are determined automatically through analysis of documents. The timeline 1640 of some embodiments includes selectable items that can narrow the date of the documents displayed in display area 1620.

Figure 17:

FIG. 17 illustrates the GUI 1600 after a user has (i) selected a second business line (Missiles & Missile Defense Systems) of Boeing in the business lines display area 1610 and (ii) modified the view of the document display area 1630. By selecting a "details" tab 1730, the user has modified the document display area 1630 such that more information is displayed about the documents in the display area. In addition, by selecting the second business line, a new article ("Boeing eyes Asia for defense business") is now displayed in the document display area that was not displayed when only the first business line was selected.

VII. Overall System Architecture

As described above, in some embodiments the business line and competitor analysis described in this application is used within a system which is accessed by users to perform research. The back-end of the system categorizes new documents from the world wide web on a regular basis for thousands of different categories (including business lines and companies) and identifies business lines and competitors for the companies. Researchers (e.g., market analysts) access the front-end of the system through a user interface to access the data created by the back-end of the system.

Figure 18:
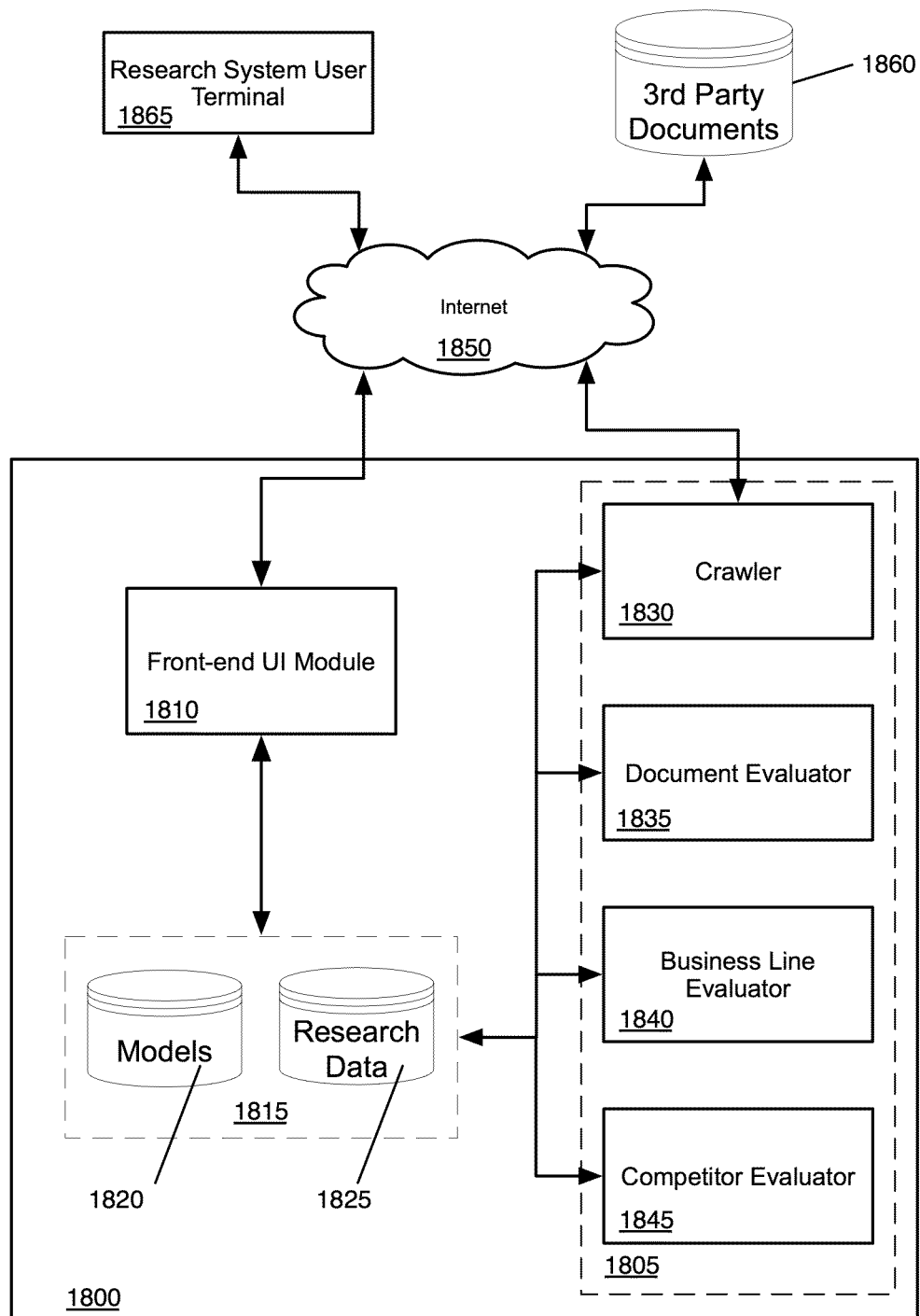
FIG. 18 conceptually illustrates the overall software architecture of a system of some embodiments.

FIG. 18 conceptually illustrates the overall software architecture of such a system 1800 of some embodiments. One of ordinary skill will recognize that the various modules shown in this figure may all operate on a single electronic device (e.g., a server) or may be spread among numerous such devices. The system 1800 includes a document retrieval and research system 1805, a front-end UI module 1810, and storages 1815.

The storages 1815 include a model storage 1820 and a research data storage 1825. The model storage 1820 stores the models used for evaluation of documents, as described above in Sections II and III. The research data storage 1825 stores the data structures (e.g., databases) with document, company, and business line information. In some embodiments, copies of document retrieved by the sub-system 1805 are also stored in the research data. The storages 1815 may be entirely contained on one physical storage or may be spread across multiple physical storages (e.g., one storage for the models and another for the documents, multiple storages for the documents, etc.).

The document retrieval and research system 1805 retrieves documents from the web, classifies the documents, and performs additional research based on the document information. The document retrieval and research system 1805 includes a crawler 1830, a document evaluator 1835, a business line evaluator 1840, and a competitor evaluator 1845. The crawler 1830 is connected to the Internet 1850 and crawls the Internet on a regular basis in order to identify new documents stored on third party storages 1860 (e.g., web servers). Some embodiments download copies of these new documents and store the copies in the research data storage 1825.

The document evaluator 1835 evaluates each of the new documents using the models stored in storage 1820 for a wide variety of categories to determine which documents are relevant to which categories. The document evaluator 1835 stores the relevancy information for the various documents in the research data 1825. The business line evaluator 1840 evaluates each company that has an entry in the research data 1825 to identify the company's business lines (as described above in Section IV), and stores this information in the research data as well. The competitor evaluator 1845 evaluates each of the companies to identify the company's competitors (as described above in Section V), and stores this information in the research data 1825 as well.

The various information stored in the research data 1825 is accessed by research system users 1865 via remote terminals (e.g., laptop and desktop computers, portable devices such as tablets and smart phones, etc.) that connect to the system through the Internet 1850. The users interact with the UI generation and interaction module 1810 that receives information from the user (e.g., a company about which the user desires information, UI interactions, etc.) and generates a user interface to send to the user (e.g., for display in a web browser). Examples of such a UI are discussed above in Section VI.

While many of the features of system 1800 have been described as being performed by one module (e.g., the business line evaluator 1840), one of ordinary skill will recognize that the functions might be split up into multiple modules. Furthermore, the modules shown might be combined into a single module in some embodiments.

VIII. Computing Device

Many of the above-described processes and modules are implemented as software processes that are specified as a set of instructions recorded on a computer readable storage medium (also referred to as "computer readable medium" or "machine readable medium"). These instructions are executed by one or more computational elements, such as one or more processing units of one or more processors or other computational elements like Application-Specific ICs ("ASIC") and Field Programmable Gate Arrays ("FPGA"). The execution of these instructions causes the set of computational elements to perform the actions indicated in the instructions. Computer is meant in its broadest sense, and can include any electronic device with a processor. Examples of machine readable media include, but are not limited to, CD-ROMs, flash drives, RAM chips, hard drives, EPROMs, etc. The machine readable media does not include carrier waves and/or electronic signals passing wirelessly or over wired connection.

In this specification, the term "software" includes firmware residing in read-only memory or applications stored in magnetic storage that can be read into memory for processing by one or more processors. Also, in some embodiments, multiple software inventions can be implemented as parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computing devices define one or more specific machine implementations that execute and perform the operations of the software programs.

Figure 19:
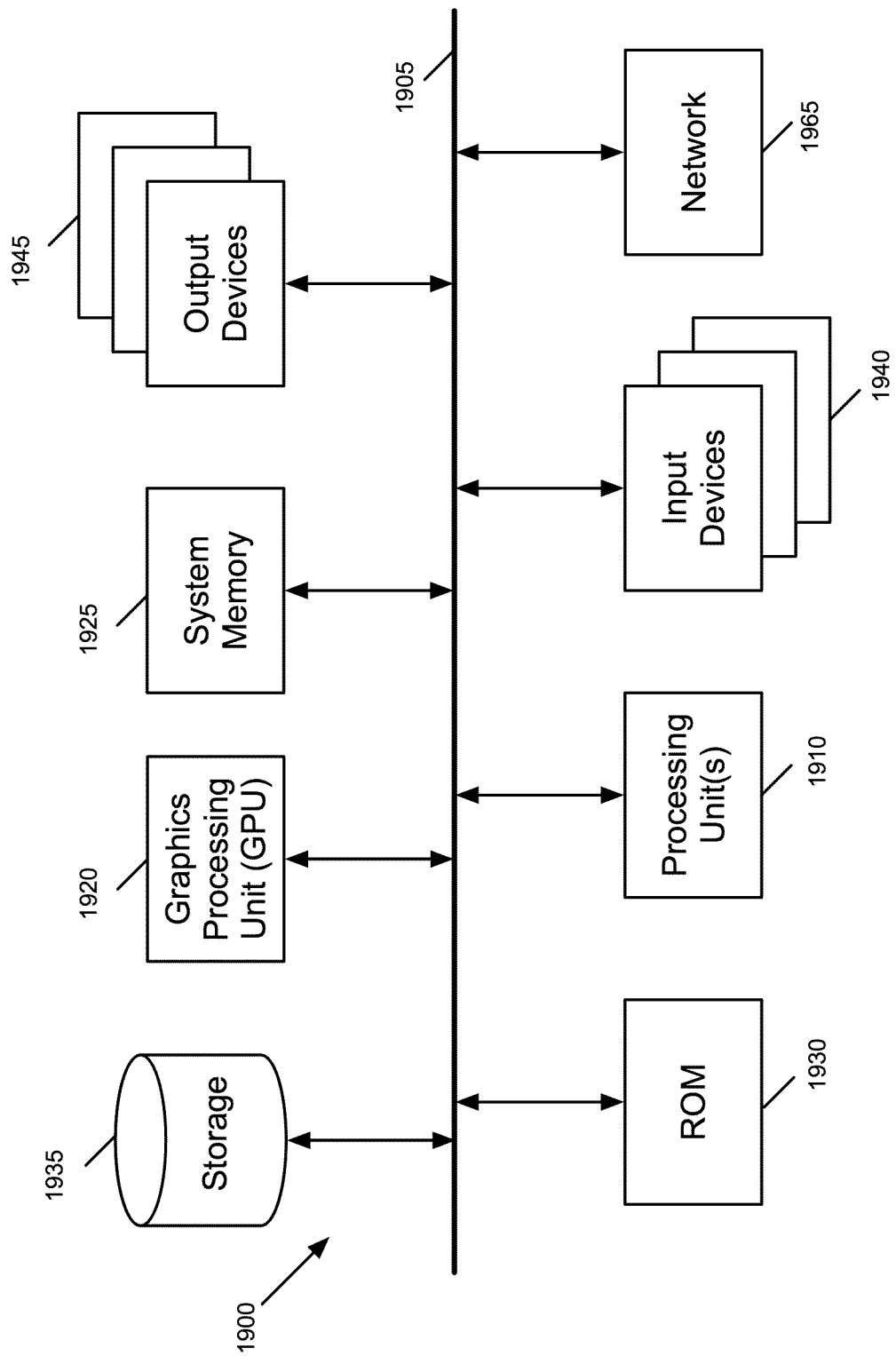
FIG. 19 conceptually illustrates a computing device with which some embodiments of the invention are implemented.

FIG. 19 conceptually illustrates a computing device 1900 with which some embodiments of the invention are implemented. For example, the processes described by reference to FIGS. 2, 6, 9, 11, and 14 may be at least partially implemented using sets of instructions that are run on the computing device 1900.

Such a computing device includes various types of machine readable mediums and interfaces for various other types of machine readable mediums. Computing device 1900 includes a bus 1910, at least one processing unit (e.g., a processor) 1920, a system memory 1935, a read-only memory (ROM) 1940, a permanent storage device 1950, input devices 1970, output devices 1980, and a network connection 1990. The components of the computing device 1900 are electronic devices that automatically perform operations based on digital and/or analog input signals.

One of ordinary skill in the art will recognize that the computing device 1900 may be embodied in other specific forms without deviating from the spirit of the invention. For instance, the computing device may be implemented using various specific devices either alone or in combination. For example, a local PC may include the input devices 1970 and output devices 1980, while a remote PC may include the other devices 1910-1950, with the local PC connected to the remote PC through a network that the local PC accesses through its network connection 1990 (where the remote PC is also connected to the network through a network connection).

The bus 1910 collectively represents all system, peripheral, and chipset buses that communicatively connect the numerous internal devices of the computing device 1900. In some cases, the bus 1910 may include wireless and/or optical communication pathways in addition to or in place of wired connections. For example, the input devices 1970 and/or output devices 1980 may be coupled to the system 1900 using a wireless local area network (W-LAN) connection, Bluetooth®, or some other wireless connection protocol or system.

The bus 1910 communicatively connects, for example, the processor 1920 with the system memory 1935, the ROM 1940, and the permanent storage device 1950. From these various memory units, the processor 1920 retrieves instructions to execute and data to process in order to execute the processes of some embodiments. In some embodiments the processor includes an FPGA, an ASIC, or various other electronic components for execution instructions.

The ROM 1940 stores static data and instructions that are needed by the processor 1920 and other modules of the computing device. The permanent storage device 1950, on the other hand, is a read-and-write memory device. This device is a non-volatile memory unit that stores instructions and data even when the computing device 1900 is off. Some embodiments of the invention use a mass-storage device (such as a magnetic or optical disk and its corresponding disk drive) as the permanent storage device 1950.

Other embodiments use a removable storage device (such as a floppy disk, flash drive, or CD-ROM) as the permanent storage device. Like the permanent storage device 1950, the system memory 1935 is a read-and-write memory device. However, unlike storage device 1950, the system memory 1935 is a volatile read-and-write memory, such as a random access memory (RAM). The system memory stores some of the instructions and data that the processor needs at runtime. In some embodiments, the sets of instructions and/or data used to implement the invention's processes are stored in the system memory 1935, the permanent storage device 1950, and/or the read-only memory 1940. For example, the various memory units include instructions for processing multimedia items in accordance with some embodiments.

The bus 1910 also connects to the input devices 1970 and output devices 1980. The input devices 1970 enable the user to communicate information and select commands to the computing device. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 1980 include printers, electronic display devices that display still or moving images, and electronic audio devices that play audio generated by the computing device. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computing device.

Finally, as shown in FIG. 19, bus 1910 also couples computer 1900 to a network 1990 through a network adapter (not shown). In this manner, the computer can be a part of a network of computers (such as a local area network ("LAN"), a wide area network ("WAN"), an Intranet, or a network of networks, such as the Internet. For example, the computer 1900 may be coupled to a web server (network 1990) so that a web browser executing on the computer 1900 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "computing device", "server", "processor", and "memory" all refer to electronic or other technological devices. These terms exclude people or groups of people. For the purposes of this specification, the terms display or displaying mean displaying on an electronic device. As used in this specification and any claims of this application, the terms "machine readable medium" and "machine readable media" are entirely restricted to tangible, physical objects that store information in a form that is readable by a computer. These terms exclude any wireless signals, wired download signals, and/or any other ephemeral signals.

It should be recognized by one of ordinary skill in the art that any or all of the components of computing device 1900 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. Moreover, while the examples shown illustrate many individual modules as separate blocks, one of ordinary skill in the art would recognize that some embodiments may combine these modules into a single functional block or element. One of ordinary skill in the art would also recognize that some embodiments may divide a particular module into multiple modules.

In addition, a number of the figures (including FIGS. 2, 6, 9, 11, and 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

We claim:

1. A method, implemented by an electronic device, of operating operates a search engine to identify documents on a network based on content relevancy and identifying business lines of a company, the method comprising:

executing a web crawler to search for and retrieve documents on the network;
 storing in an electronic memory a plurality of company data structures for a plurality of companies, each company data structure storing patterns of document elements in documents retrieved including anchor word sets and other word sets with a context of each anchor word in an anchor word set parsing a document to identify words in the document;
 identifying anchor words in the document;
 if a predetermined number of anchor words are present in the document perform an evaluation process a. through h.:
  a. comparing, by the electronic device, a set of documents from a plurality of resources with a first set of content relevance models that define relevance of the documents to different companies and a second set of content relevance models that define relevance of the documents to different business lines, wherein each content relevance model includes (i) data that is used to identify documents related to a business line or a company that the model represents, (ii) the patterns of document elements associated with scores, and (iii) parameters used in the analysis of documents by the model;
  b. accessing the first and second patterns and based on the patterns and calculating a content relevance score as an arithmetic function of the patterns and parameters of the content relevance models, wherein the content relevant score represents at least a number of anchor words in each document related to one or more of the business lines and one or more of the companies;
  c. when a particular document in the set of documents satisfies a particular content relevance score of a particular content relevance model, in the first set of content relevance models, associated with a particular company, associating the particular company with the particular document by storing an identifier of the particular company in a data structure for the document;
  d. when a particular document in the set of documents satisfies a particular content relevance score of a particular content relevance model, in the second set of content relevance models, associated with a particular business line, associating the particular business line with the particular document by storing an identifier of the particular business line in a data structure for the document;
  e. determining a first threshold number and a second threshold number, wherein (i) the first threshold number is dependent on the first business line, (ii) the second threshold number is dependent on the second business line, and (iii) the first threshold number is different from the second threshold number;
  f. when more than the first threshold number of documents are associated with a first company and a first business line, specifying the first business line as a business line of the first company by storing an identifier of the first business line in a data structure for the first company;
  g. when more than the second threshold number of documents are associated with a second company and a second business line, specifying the second business line as a business line of the second company by storing an identifier of the second business line in a data structure for the second company; and
  h. upon receiving a request for the first company, accessing, searching the data structure for the identifiers, and displaying a set of data for a business line associated with the first company based on the stored identifiers in the data structure for the first company;
 if a predetermined number of anchor words are not present in the document, do not perform the evaluation process a. through h.

2. The method of claim 1, wherein the documents are retrieved from the world wide web.

3. The method of claim 1, wherein a particular threshold number is higher for business lines in a first set of industries than for business lines in a second set of industries.

4. The method of claim 3, wherein the first set of industries comprises the financial industry.

5. The method of claim 1, wherein a particular threshold number is lower when the overall number of documents classified as relevant to the an associated company is lower.

6. The method of claim 1, wherein the first threshold number is further dependent on the first business line.

7. The method of claim 6, wherein the second threshold number is further dependent on the second business line.

8. The method of claim 1, wherein specifying the first business line as a business line of the first company further comprises storing a reference to the first company in a data structure for the first business line and specifying the second business line as a business line of the second company further comprises storing a reference to the second company in a data structure for the second business line.

9. The method of claim 1, wherein the first threshold number is further dependent on a third business line associated with the first company.

10. The method of claim 9, wherein the third business line comprises a financial industry business line.

11. The method of claim 10, wherein the first business line comprises a technology industry business line.

12. A non-transitory machine readable medium storing a program which when executed by at least one processing unit operates a search engine to identify documents on a network based on content relevancy identifies business lines of a company, the program comprising sets of instructions for:

executing a web crawler to search for and retrieve documents on the network;
 storing in an electronic memory a plurality of company data structures for a plurality of companies, each company data structure storing patterns of document elements in documents retrieved including anchor word sets and other word sets with a context of each anchor word in an anchor word set parsing a document to identify words in the document;

identifying anchor words in the document;

if a predetermined number of anchor words are present in the document perform an evaluation process a. through h:

a. comparing a set of documents from a plurality of resources with a first set of content relevance models that define relevance of the documents to different companies and a second set of content relevance models that define relevance of the documents to different business lines, wherein each content relevance model includes (i) data that is used to identify documents related to a business line or a company that the model represents, (ii) the patterns of document elements associated with scores, and (iii) parameters used in the analysis of documents by the model;

b. accessing the first and second patterns and based on the patterns and calculating a content relevance score as an arithmetic function of the patterns and parameters of the content relevance models, wherein the content relevant score represents at least a number of anchor words in each document related to one or more of the business lines and one or more of the companies;

c. when a particular document in the set of documents satisfies a particular content relevance model, in the first set of content relevance models, associated with a particular company, associating the particular company with the particular document by storing an identifier of the particular company in a data structure for the document;

d. when a particular document in the set of documents satisfies a particular content relevance model, in the second set of content relevance models, associated with a particular business line, associating the particular business line with the particular document by storing an identifier of the particular business line in a data structure for the document;

e. determining a first threshold number and a second threshold number, wherein (i) the first threshold number is dependent on the first business line, (ii) the second threshold number is dependent on the second business line, and (iii) the first threshold number is different from the second threshold number;

f. when more than the first threshold number of documents are associated with a first company and a first business line, specifying the first business line as a business line of the first company by storing an identifier of the first business line in a data structure for the first company;

g. when more than the second threshold number of documents are associated with a second company and a second business line, specifying the second business line as a business line of the second company by storing an identifier of the second business line in a data structure for the second company; and h. upon receiving a request for the first company, accessing, searching the data structure for the identifiers, and displaying a set of data for a business line associated with the first company based on the stored identifiers in the data structure for the first company;

if a predetermined number of anchor words are not present in the document, do not perform the evaluation process a. through h.

13. The non-transitory machine readable medium of claim 12, wherein the first threshold number is further dependent on a third business line associated with the first company.

14. The non-transitory machine readable medium of claim 13, wherein the first business line comprises a financial industry business line.

15. The non-transitory machine readable medium of claim 14, wherein the second business line comprises a technology industry business line.

16. The non-transitory machine readable medium of claim 12, wherein the first threshold number is further dependent on an overall number of documents classified as relevant to the first company.

17. The non-transitory machine readable medium of claim 12, wherein the set of instructions for specifying the first business line as a business line of the first company further comprises a set of instructions for storing a reference to the first company in a data structure for the first business line.

18. The non-transitory machine readable medium of claim 17, wherein the set of instructions for specifying the second business line as a business line of the second company further comprises a set of instructions for storing a reference to the second company in a data structure for the second business line.

19. The non-transitory machine readable medium of claim 12, wherein the set of instructions for comparing the set of documents from the plurality of resources with the first set of content relevance models and the second set of content relevance models comprises a set of instructions for identifying a set of patterns of document elements in each document, each pattern previously identified as indicating relevance to a specific business line.

* * * * *